United States Patent

Noguchi

[11] Patent Number: 6,101,272
[45] Date of Patent: Aug. 8, 2000

[54] COLOR TRANSFORMING METHOD

[75] Inventor: Takafumi Noguchi, Kanagawa, Japan

[73] Assignee: Fuji Photo Film Co., Ltd., Kanagawa, Japan

[21] Appl. No.: 08/990,006

[22] Filed: Dec. 12, 1997

[30] Foreign Application Priority Data

| Dec. 12, 1996 | [JP] | Japan | 8-332037 |
| Dec. 12, 1996 | [JP] | Japan | 8-332043 |
| May 28, 1997 | [JP] | Japan | 9-138853 |

[51] Int. Cl.$^7$ .............. G06K 9/00; G03F 3/08
[52] U.S. Cl. .............. 382/167; 358/520
[58] Field of Search .............. 358/520, 518, 358/523, 524, 539, 1.9; 382/162, 165, 167, 166; 348/606, 631, 653, 662, 663, 713

[56] References Cited

U.S. PATENT DOCUMENTS

| 4,839,718 | 6/1989 | Hemsky et al. | 358/520 |
| 4,963,925 | 10/1990 | Miyazaki | 355/77 |
| 5,060,060 | 10/1991 | Udagawa | 358/520 |
| 5,317,426 | 5/1994 | Hoshino | 358/515 |
| 5,363,218 | 11/1994 | Hoshino | 358/518 |
| 5,384,601 | 1/1995 | Yamashita et al. | 358/520 |
| 5,450,216 | 9/1995 | Kasson | 382/167 |
| 5,488,670 | 1/1996 | Suzuki et al. | 382/165 |
| 5,502,579 | 3/1996 | Kita et al. | 358/518 |

*Primary Examiner*—Madeleine Nguyen
*Attorney, Agent, or Firm*—Sughrue, Mion, Zinn, Macpeak & Seas, PLLC

[57] ABSTRACT

The improved color transformation method comprises determining for each pixel a lightness component specified between a maximum and a minimum value for three signals and chromaticity components obtained by excluding the lightness component from the three signals, amplifying or attenuating the thus obtained chromaticity components in accordance with the three signals and adding them to the lightness component amplified or attenuated in accordance with the three signals. Even if the input original image is a subject, a transmission original hardcopy image, a reflection original softcopy image or an original softcopy image, one can create a reproduced hardcopy image such as a reflective print which is extremely faithful to the input original image or, alternatively, one can provide a monitor display of a reproduced image (a reproduced soft copy image) which is also extremely faithful to the input original image. The processing system is very simple and permits realtime execution. Even transmission original hardcopy images and original softcopy images which are upset in either color balance or density balance or both can be effectively processed to yield reproduced reflection hardcopy image or reproduced softcopy images which feature good balances.

17 Claims, 9 Drawing Sheets

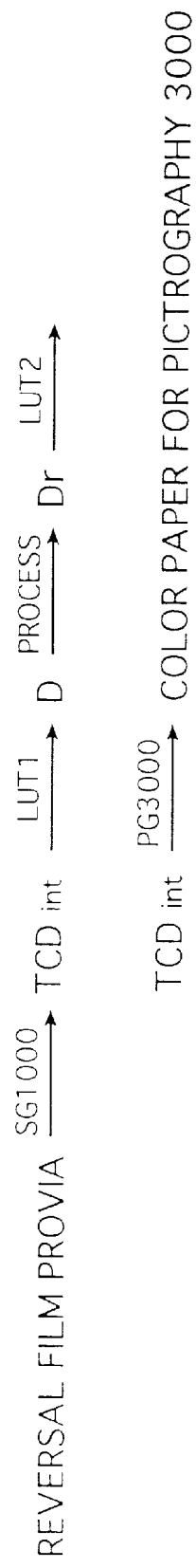
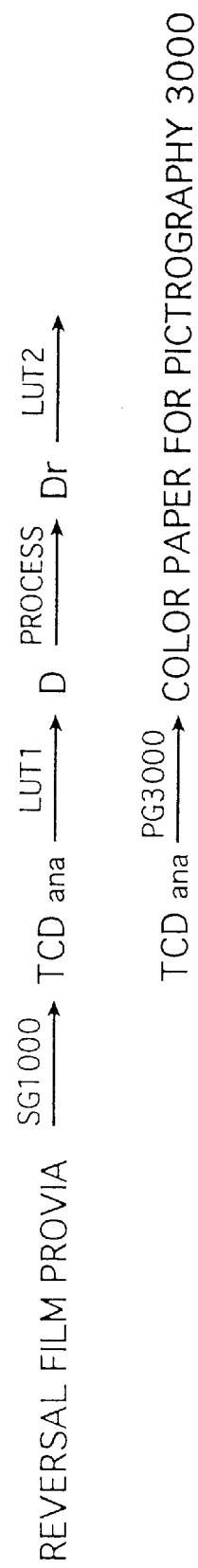

COLOR TRANSFORMING METHOD

BACKGROUND OF THE INVENTION

This invention relates to a color transforming method which intends to achieve visually faithful or preferred color reproduction of color images. More particularly, the invention relates to a color transforming method by which input digital image data are converted to the image signals required for the original image in an input (color space) system to be reproduced faithfully in an output (color reproduction) system having a different color gamut (color space) such as a different dynamic density range than in the input (color space) system, as well as a color transforming method for achieving transformation to image signals that are required to ensure that the important colors are reproduced preferably, that is, in a visually preferred lightness level, whether the input color space is the same as the output color space or not. More specifically, the invention relates to a color transforming method by which image signals read with a scanner or the like from transmission or reflection original hardcopy images obtained by photographing a subject on reversal films or negative films, or image signals obtained by photographing a subject directly with a solid-state imaging device such as a CCD, or image signals of an image displayed on a TV monitor are converted to the digital signals that are required for creating reproduced reflection hardcopy images visually faithful to the transmission original hardcopy images, the subject, the monitor and the like, or reproduced reflection hardcopy images on which the important colors are reproduced in a visually preferred lightness level, or for displaying reproduced softcopy images on the monitor or the like which are visually faithful to the transmission originals, reflection original, the subject and the like, or reproduced softcopy images on the monitor or the like in which the important colors are reproduced in a visually preferred lightness level.

In recent years, there is an increasing use of an image processing system which involves the reading of an exposed film with a scanner and subsequent conversion to digital image signals (the system is hereunder referred to as a "hybrid system") and a digital image processing system in which a subject is photographed with a digital camera or the like to obtain digital image signals directly. The digital and hybrid systems provide more flexibility in image processing than the analog system but, on the other hand, they suffer from increased costs. Therefore, the success of the hybrid and digital systems depends on whether the improvement in image quality justifies the increased cost.

The hybrid system uses the same input original as in the analog system, so in order to achieve an improvement in image quality, the image processing procedure has to be reviewed in terms of zero base. This is also true with the digital system. The image processing procedure can generally be classified into three stages of setup, range compression (extension) and design. These three elements of the image processing system have their own counterparts in the visual perception as follows: setup can be compared to luminance adaptation and chromatic adaptation, range compression (extension) is similarly named in the visual perception, and design modifications in the image processing system can be compared to retrieving colors from memory and rendering preferred colors.

Among the three elements of the image processing system, setup and design have been studied extensively to provide several important findings. On the other hand, only few findings have so far been attained in the study of range compression (extension). If studied at all, the range compression is in many cases discussed in terms of the relationship between the original scene and a hard copy but if the input range is sufficiently wider than the output range, the input need not be the original scene. In addition, from a practical viewpoint, the original scene is generally difficult to measure. For these reasons, in the following discussion of the prior art of range compression and its problems, we assume that a reversal film is the original which is range compressed to a photographic paper (hereunder "paper"). In order to circumvent the problem with setup, we also assume that the input original is limited to what has been exposed appropriately and in order to get around the problem with design, it is assumed that the paper should reproduce an image which, as perceived by the eye, is faithful to the original on the reversal film.

Speaking of the dynamic range, the paper is less flexible than the reversal film and the former has typically a density range of about 2.0 whereas the latter has a density range of about 3.0. Therefore, if the reversal film is simply output, the highlights and shadows become "flat" (lose contrast) to impair the image quality considerably. To deal with this problem, range compression is required. However, if range compression merely involves rendering the input original "less contrasty", the output picture is quite poor in aesthetic appeal on account of the deteriorated contrast and chroma. Thus, the reproduction of highlights and shadows and that of contrast and chroma are tradeoffs.

To deal with this situation, two techniques are currently employed in photography, printings and other areas of producing hardcopy images; one technique involves rendering the input image less contrasty and restoring the chroma by the "interlayer effect" or color correction, and the second technique commonly called "dodging" involves printing with the shadows in the exposed area being covered with a mask. However, these techniques have their own limitations. In the former technique, the hue fidelity deteriorates as the chroma improves and the skin color acquires a red tinge. In other words, the reproduction of chroma and that of hue are tradeoffs. Dodging which essentially involves a two-dimensional arithmetic operation is low in operating efficiency and is not cost-effective. Automatic dodging machines have recently been commercialized but the problem of high calculation loads is still incumbent.

In color science, range compression (extension) is a subject which is actively studied as part of gamut mapping on CIELab. Most of the studies so far made depend on the combined use of compression and clipping but the problem is that the timing of determining which method to use depends on the graphics pattern.

Fidelity as perceived by the eye is also required by TV monitors, video projectors and other machines that produce softcopy images; when subjects photographed with digital cameras, video cameras, etc. or images on transmission and reflection original hardcopy images as read with scanners, etc. are to be displayed as reproduced softcopy images on TV monitors, video projectors, etc. or when original softcopy image displayed on TV monitors, video projectors, etc. are to be replicated on reflection reproduced hardcopy images, it is required to reproduce output softcopy/hardcopy images that are faithful to the input hardcopy/softcopy as perceived with the eye. However, color gamut such as the dynamic density range do not necessarily coincide between the input and output spaces and the various problems described in the preceding paragraphs exist.

In both the hybrid and digital systems, the color transformation process for preparing reflection prints consists of gamma increasing and color correction steps. In the gamma increasing step, the density contrast of a reflection print is generally recommended to be higher than that of the subject by a factor of 1.8 (if the reflection print is to be prepared from the density data of a color negative film, the value should be increased to 2.5 ($\cong$1.8/0.7) in consideration of the fact that the characteristic curve of the color negative film has a gamma ($\gamma$) of 0.7). The color correction step is often performed by the matrix operation using for example a 3×3 or 3×9 color correcting matrix.

The color transforming process is commonly adapted to be performed in the order of gamma increasing and color correction (see FIG. 9a) but the order may be reversed such that color correction is performed first (FIG. 9b).

The process designs shown in FIGS. 9a and 9b generally yield different results; however, if the gamma increasing is a linear process while the color correction is expressed by a 3×3 matrix, the two operations yield the same result as the following equation shows:

$$\begin{bmatrix} B'' \\ G'' \\ R'' \end{bmatrix} = 1.8 \begin{bmatrix} a_{11} & a_{12} & a_{13} \\ a_{21} & a_{22} & a_{23} \\ a_{31} & a_{32} & a_{33} \end{bmatrix} \begin{bmatrix} B \\ G \\ R \end{bmatrix} = \begin{bmatrix} a_{11} & a_{12} & a_{13} \\ a_{21} & a_{22} & a_{23} \\ a_{31} & a_{32} & a_{33} \end{bmatrix} 1.8 \begin{bmatrix} B \\ G \\ R \end{bmatrix}$$

In the color reproducing process, the colors of skin (face), green (grass) and sky (blue) are called "important colors" and often require selective processes for their reproduction. As for the reproduction of lightness, it is generally recommended that the skin color be finished "light" (faint) whereas the blue sky color "dark" (deep).

When an image formed on a copy or a first image forming medium is to be replaced on a second image forming medium, complex color reproducing processes have to be performed in order to ensure the preferred color reproduction that appropriate color reproduction is compatible with the selective reproduction of the important colors, in particular the skin and sky colors, in a visually preferred lightness level. To this end, persons having ordinary skill have carried out gradation modification in the field of plate making and dodging or other processing in the field of photography. Both the cases required highly skilled practice. Thus, there has been a strong need for a method by which colors (important colors) can be simply and selectively reproduced in a visually preferred lightness level, while being properly reproduced in the replication of the image.

SUMMARY OF THE INVENTION

The present invention has been accomplished under these circumstances and has as its first object providing a color transforming method by which an output image faithful to an input image can be reproduced realtime and very easily in an output color reproduction system different from an input color space system.

A second object of the invention is to provide a color transforming method that is capable of producing reproduced reflection hardcopy images or reproduced softcopy images having an extremely high fidelity to transmission original hardcopy images, subjects or original softcopy images and which permits the required image processing to be executed realtime and easily using a very simple processing system.

A third object of the invention is to provide a color transforming method which, in addition to attaining the two stated objects, enables reproduced reflection hardcopy images or reproduced softcopy images of good color and density balances to be prepared realtime and easily by means of a very simple processing system even if the input is transmission original hardcopy images which are upset in color or density balance or original image signals which are not appropriate in terms of exposure or display conditions.

A fourth object of the invention is to satisfy the above-mentioned need of the prior art by providing a color transforming method capable of achieving the preferred color reproduction, by which the important colors, in particular the skin and sky colors are elicited from the hue information in an input color space system and the lightness of these colors is controlled in a selective and very simple manner and finished to a visually preferred lightness level while, at the same time, the colors of an input image can be properly reproduced on the output image, in an output color reproducing system of which the color gamut is the same as or different from that of the input color space system.

In other words, the preferred color reproduction to be achieved is based on the faithful color reproduction of the input image, but intentionally deviated from the faithful color reproduction as to the important colors, which are to be reproduced in a visually preferred manner.

A fifth object of the invention is to provide a color transforming method which is capable of outputting a reproduced reflection hardcopy image or a reproduced softcopy image on which the colors of a transmission original hardcopy image, subject or original softcopy image are properly reproduced, with the important colors being selectively finished to a visually preferred lightness level and which is capable of executing the necessary image processing procedures by a simple processing system in a realtime and convenient manner.

According to a first embodiment of the invention, the stated objects can be attained by a color transformation method in which input image data represented by three signals that mutually independent and provide a color of gray when values of three signals are subjected to color transformation to produce output image data represented by three color transformed signals, which method comprises the steps of determining for each pixel a lightness component specified between a maximum and a minimum value for said three signals and chromaticity components obtained by excluding said lightness component from said three signals, amplifying or attenuating the thus obtained chromaticity components in accordance with said three signals and adding them to said lightness component amplified or attenuated in accordance with said three signals.

When said three signals are designated by (B,G,R) and said three color transformed signals by (B',G',R') for each pixel, the color transformation from said three signals to said three color transformed signals is preferably represented by the following set of equations (1):

$B'=K_{01}\{B-f(B,G,R)\}+k_1\{f(B,G,R)-C_1\}+C_2$ $G'=K_{02}\{G-f(B,G,R)\}+k_1\{f(B,G,R)-C_1\}+C_2$ $R'=K_{03}\{R-f(B,G,R)\}+k_1\{f(B,G,R)-C_1\}+C_2$ (1)

where f(B,G,R) is a function that satisfies min(B,G,R)$\leq$f(B,G,R)$\leq$max(B,G,R) for any set of said three signals (B,G,R); the coefficients $K_{01}$, $K_{02}$, $K_{03}$ and $k_1$ are positive real numbers specified in accordance with said three signals B, G and R; and $C_1$ and $C_2$ are constants specified by the color transforming system or the image to be subjected to color transformation.

Preferably, all of the coefficients $K_{01}$, $K_{02}$ and $K_{03}$ take the same value $k_0$ ($k_0$>0).

When all of the numerical values of the respective three signals coincide and are expressed by a signal value N, the signal value N is preferably a linear function of a logarithm or a power of a luminance L of the corresponding gray, and expressed by the following equation (2) or (3), respectively:

$$N=c_1 \log L + c_2 \qquad (2)$$

$$N=c_1 L^\gamma c_2 \qquad (3)$$

where the exponent $\gamma$ is a real number satisfying $0<\gamma<1$, and $c_1$ and $c_2$ are constant.

Preferably, the three signals represent any one of equivalent neutral density, integral equivalent neutral density, exposure density, logarithmic exposure, calorimetric density, TV monitor signals or those represented by the following set of equations (4):

$$N_X=(X/X_0)^{1/3}=(L^*+16)/116+a^*/500$$

$$N_Y=(Y/Y_0)^{1/3}=(L^*+16)/116$$

$$N_Z=(Z/Z_0)^{1/3}=(L^*+16)/116-b^*/200 \qquad (4)$$

where X, Y and Z are tristimulus values and $X_0$, $Y_0$ and $Z_0$ are the tristimulus values of a reference white; and L* is a psychometric lightness for the L*a*b* color space; and a* and b* are perceived psychometric chromaticities.

Preferably, said lightness component is a maximum value, a minimum value or a median value of said three signals.

Preferably, the image data are setup image data obtained by adjustment of brightness and/or white balance.

Preferably, in a second embodiment of the invention, said input image data are captured or scanned data of original scene or original hardcopy image, and said output image data are image data to produce hardcopy images.

Or, according to a second embodiment of the invention, the stated objects can be attained by a color transforming method in which a subject or an original image formed on a transparent medium comprising at least three colorants is replicated on a reflection medium comprising at least three colorants, which method comprises the steps of:

- transforming said subject or said original image to signals the three values of which coincide for a plurality of colors visually perceived as gray for each pixel and which are on a logarithmic scale with respect to the intensity of light;
- using the obtained three signals for each pixel to determine a single lightness component specified between their maximum and minimum values and a chromaticity component obtained by excluding said lightness component from each of said three signals;
- amplifying or attenuating the thus obtained three chromaticity components in accordance with said three signals and also amplifying or attenuating said lightness component in accordance with said three signals and thereafter adding the thus amplified or attenuated lightness component to each of said amplified or attenuated three chromaticity components so as to transform them to three (first) color transformed signals; and thereafter
- transforming said three (first) color transformed signals to at least three second color transformed signals for replication on said reflection medium.

When said three signals are designated by (B2,G2,R2) and said three (first) color transformed signals by (B3,G3, R3) for each pixel, the transformation from said three signals to said three (first) color transformed signals is preferably executed by the following set of equations (5):

$$B3=k_0(B2-A)+k_1(A-\min_{(xy)}A)+BW$$

$$G3=k_0(G2-A)+k_1(A-\min_{(xy)}A)+GW$$

$$R3=k_0(R2-A)+k_1(A-\min_{(xy)}A)+RW \qquad (5)$$

where A is a function that represents said lightness component specified for said three signals (B2,G2,R2) and which satisfies $\min\{B2,G2,R2\} \leq A \leq \max\{B2,G2,R2\}$; $k_0$ and $k_1$ are constants; (BW,GW,RW) represents the base density of the reflection medium; and $\min_{(xy)}A$ represents a minimum value of A for all pixels in the entire image forming area.

Preferably, said lightness component A is represented by any one of the equations: $A=\min\{B2,G2,R2\}$, $A=\max\{B2, G2,R2\}$ and $A=\text{median}\{B2,G2,R2\}$, where "median" is a function representing the second largest value for a given set of (B2,G2,R2).

Preferably, said hardcopy original image is a color positive image formed on a transparent medium comprising at least three colorants and said constants $k_0$ and $k_1$ satisfy $0.7<k_1<k_0\leq 1$.

If said minimum value $\min_{(xy)}A$ is to be replaced by a constant, it is preferably a constant between 0.0 and 0.3, more preferably between 0.1 and 0.2.

In another preferred case, said original hardcopy image is a color positive image formed on a transparent medium comprising at least three colorants, said three signals represent equivalent neutral densities of three colors obtained by a process comprising recording said color positive image with a scanner having three linearly independent spectral sensitivities to produce original image signals for each pixel, transforming them to produce analytical densities as measured by said scanner and transforming said analytical densities, and said three (first) color transformed signals represent the color transformed equivalent neutral densities of the three colors and are transformed to at least three second color transformed signals for replication on the reflection medium.

In yet another preferred case, said hardcopy original image is a color positive image formed on a transparent medium comprising at least three colorants, said three signals represent integral equivalent neutral densities of three colors obtained by a process comprising recording said color positive image with a scanner having three linearly independent spectral sensitivities to produce original image signals for each pixel, transforming them to produce integral densities as measured by said scanner and transforming said integral densities, and said three (first) color transformed signals represent the color transformed integral equivalent neutral densities of the three colors and are transformed to at least three second color transformed signals for replication on the reflection medium.

In a still preferred case, said three signals represent integral equivalent neutral densities of three colors obtained by a process comprising directly recording said subject with a solid-state imaging device having three linearly independent spectral sensitivities to produce original image signals for each pixel, transforming them to produce exposure densities dependent on said solid-state imaging device and transforming said exposure densities, and said three (first) color transformed signals represent the color transformed integral equivalent neutral densities of the three colors and are transformed to at least three second color transformed signals for replication on the reflection medium.

In another preferred case, said three signals represent integral equivalent neutral densities of three colors obtained by a process comprising photographing said subject on a color negative film having three linearly independent spectral sensitivities, transforming said photographed subject to exposure densities per pixel dependent on said color negative film by means of an auxiliary scanner or solid-state imaging device, and transforming said exposure densities, and said three (first) color transformed signals represent the color transformed integral equivalent neutral densities of the three colors and are transformed to at least three second color transformed signals for replication on the reflection medium.

If the three linearly independent spectral sensitivities of said scanner (solid-state imaging device or color negative film) are designated by B, G and R, said (analytical) integral (or exposure) densities by densities (B1,G1,R1) per pixel, (said equivalent neutral densities of three colors or) said integral equivalent neutral densities of three colors by densities (B2,G2,R2) per pixel, (said first color transformed equivalent neutral densities of three colors or) said (first) color transformed integral equivalent neutral densities of three colors by densities (B3,G3,R3) per pixel, and said second color transformed signals of three colors by densities (B4,G4,R4) per pixel, it is preferred that said integral densities (B1,G1,R1) per pixel are transformed to said densities (B2,G2,R2) in accordance with the following set of equations (6) with the intermediary of a preliminarily constructed first lookup table LUT1:

$$B2 = LUT1_B(B1)$$
$$G2 = LUT1_G(G1)$$
$$R2 = LUT1_R(R1) \quad (6)$$

whereas said densities (B3,G3,R3) are transformed to said densities (B4,G4,R4) in accordance with the following set of equations (7) with the intermediary of a preliminarily constructed second lookup table LUT2 and both densities are output to a printer:

$$B4 = LUT2_B(B3)$$
$$G4 = LUT2_G(G3)$$
$$R4 = LUT2_R(R3) \quad (7)$$

provided that if the densities B4, G4 and R4 are greater than the maximum density of said reflection medium or smaller than its minimum density, the densities are clipped to said maximum or minimum value respectively. Alternatively, instead of determining said densities (B2,G2,B2) by direct conversion from said densities (B1,G1,R1) with the intermediary of said first lookup table LUT1 said densities (B2,G2,R2) are preferably determined by first transforming said densities (B1,G1,R1) per pixel to integral equivalent neutral densities of three colors (B2$_{01}$,G2$_0$,R2$_0$) in accordance with the following set of equations (8) with the aid of said first lookup table LUT1:

$$B2_0 = LUT1_B(B1)$$
$$G2_0 = LUT1_G(G1)$$
$$R2_0 = LUT1_R(R1) \quad (8)$$

and then performing setup in accordance with the following set of equations (9):

$$B2 = B2_0 - BS + AS$$
$$G2 = G2_0 - GS + AS$$
$$R2 = R2_0 - RS + AS \quad (9)$$

where BS, GS and RS are values satisfying the following relations:

$$\min_{(xy)} B2_0 \leq BS \leq \max_{(xy)} B2_0$$
$$\min_{(xy)} G2_0 \leq GS \leq \max_{(xy)} G2_0$$
$$\min_{(xy)} R2_0 \leq RS \leq \max_{(xy)} R2_0$$

where $\min_{(xy)} B2_0$, $\min_{(xy)} G2_0$ and $\min_{(xy)} R2_0$ represent the minimal values of $B2_0$, $G2_0$ and $R2_0$ for all the pixels in the entire image forming area; $\max_{(xy)} B2_0$, $\max_{(xy)} G2_0$ and $\max_{(xy)} R2_0$ represent the maximal values of $B2_0$, $G2_0$ and $R2_0$ for all the pixels in the entire image forming area; and AS is a real number specified in accordance with BS, GS and RS.

In another preferred case, said first lookup table LUT1 is constructed by a process comprising preliminarily forming a a gray scale on the transparent medium, measuring the transmission density at more than one point by means of both said scanner and a densitometer having a fourth spectral sensitivity and plotting for each of B, G and R the transmission density from said scanner on the horizontal axis and the transmission density from said densitometer on the vertical axis, and said second lookup table LUT2 is constructed by a process comprising preliminarily forming a gray scale on the reflection medium, measuring the reflection density at more than one point by means of both said scanner and said densitometer and plotting the reflection density from said scanner on the vertical axis and the reflection density from said densitometer on the horizontal axis.

Said densitometer is preferably a visual densitometer.

Alternatively, said densitometer may preferably be replaced by any one of B, G and R in said scanner.

In yet another preferred case, said first and second lookup tables LUT1 and LUT2 are constructed by a process comprising preliminarily measuring the spectral absorption waveforms of said three colorants in said transparent and reflection media, generating for more than one lightness value a spectral absorption waveform which produces a gray under a light source s($\lambda$), integrating the generated gray spectral absorption waveforms, which may each be written as f($\lambda$), by a spectral luminous efficiency curve V($\lambda$) and the spectral absorption waveforms of thee filters in said scanner B($\lambda$), G($\lambda$) and R($\lambda$), constructing data on optical densities $D_V$, $D_B$, $D_G$ and $D_R$ in accordance with the following set of equations (10), and plotting the optical density $D_V$ on the vertical axis and optical densities $D_B$, $D_G$ and $D_R$ on the horizontal axis for each of said transparent and reflection media:

$$D_V = \log_{10} \int_{380}^{780} V(\lambda)S(\lambda)d\lambda - \log_{10} \int_{380}^{780} f(\lambda)V(\lambda)S(\lambda)d\lambda \quad (10)$$

$$D_B = \log_{10} \int_{380}^{780} B(\lambda)S(\lambda)d\lambda - \log_{10} \int_{380}^{780} f(\lambda)B(\lambda)S(\lambda)d\lambda$$

$$D_G = \log_{10} \int_{380}^{780} G(\lambda)S(\lambda)d\lambda - \log_{10} \int_{380}^{780} f(\lambda)G(\lambda)S(\lambda)d\lambda$$

$$D_R = \log_{10} \int_{380}^{780} R(\lambda)S(\lambda)d\lambda - \log_{10} \int_{380}^{780} f(\lambda)R(\lambda)S(\lambda)d\lambda$$

Preferably, said first lookup table performs an identity transformation and said second lookup table is constructed by plotting the integral and visual densities on the horizontal and vertical axes, respectively, which are dependent on the spectral sensitivities of said solid-state imaging device or said color negative film in relation to the gray scale formed on the reflection medium.

According to a third embodiment of the invention, the stated objects can be attained by a color transforming method in which the color image formed on a first medium is replicated on a second medium with said first and second media being managed in terms of integral equivalent neutral densities dependent on at least three independent spectral sensitivities and with either color gamut transformation or color correction or both being performed with the intermediary of said integral equivalent neutral densities. Preferably, the integral equivalent neutral densities are such that a signal value for the case where all numerical values for the respective elements coincide is a linear function of the logarithm or power number of a luminance corresponding to that signal value, provided that the exponent $\gamma$ is a real number satisfying $0<\gamma<1$.

According to a fourth embodiment of the invention, the stated objects can be attained by a color transforming method in which a subject is replicated on a medium by transforming the subject to exposure densities at three or more independent spectral sensitivities, managing the medium in terms of an integral equivalent neutral densities dependent on said spectral sensitivities and performing either color gamut transformation or color correction or both on said exposure densities with the intermediary of said integral equivalent neutral densities. Preferably, the exposure densities and the integral equivalent neutral densities are such that a signal value for the case where all numerical values for the respective elements coincide is a linear function of the logarithm or power number of a luminance corresponding to that signal value, provided that the exponent $\gamma$ is a real number satisfying $0<\gamma<1$.

The gray scale or gray which are used in constructing the first lookup table LUT1 and the second lookup table LUT2 is either one of the visually most preferred grays which are a little shifted from calorimetric gray to the negative side of the b* axis in the L*a *b* space or the colorimetric gray.

It is also preferred that the densities VW on a densitometer in relation to the base of said reflection medium rather than the base density values (BW, GW, RW) of the reflection medium is measured and the densities (VW,VW,VW) are substituted.

According to a first case of a fifth embodiment of the invention, the stated objects can be attained by a color transforming method in which in the color transformation of a color image represented by color signals consisting of components corresponding to blue (B), green (G) and red (R), the color signals for each pixel are transformed using a coefficient that takes a relatively small value when the hue corresponding to said color signals for each pixel is yellow red, and a relatively large value when the hue is cyan blue. Said coefficient is a function of said color signals (B,G,R) for each pixel.

Said color signals for each pixel take preferably values satisfying B>G>R when the hue corresponding thereto is yellow red, and values satisfying B<G<R when the hue is cyan blue.

Said transforming coefficient is preferably a function which includes at least one of (R–A), (A–B), (R–G), (R–B) and (G–B) where the symbol A is a function of said color signals (B,G,R) for each signal which satisfies the following equation (11):

$$\min (B,G,R) \leq A \leq \max (B,G,R) \qquad (11)$$

Said function is preferably a linear function.

The symbol A satisfies preferably the following equation (12):

$$\min (B,R) < A < \max (B,R) \qquad (12)$$

The symbol A is preferably a median value of said color signals (B,G,R) for each pixel.

Said transforming coefficient is preferably a coefficient k of gamma increasing which is expressed by the following equation (13), provided that said color signals are written as (B,G,R) and the processed color signals as (B',G',R'):

$$\begin{pmatrix} B' \\ G' \\ R' \end{pmatrix} = k \begin{pmatrix} B - C_1 \\ G - C_1 \\ R - C_1 \end{pmatrix} + \begin{pmatrix} C_2 \\ C_2 \\ C_2 \end{pmatrix} \qquad (13)$$

where $C_1$ and $C_2$ are constants specified by the color transforming system or the image to be subjected to color transformation.

Said transforming coefficient is preferably a coefficient $k_1$ of gamma increasing which is expressed by the following equation (14), provided that said color signals are written as (B,G,R) and the processed color signals as (B',G',R'):

$$B'=k_{01}(B-A)+k_1(A-C_1)+C_2$$

$$G'=k_{02}(G-A)+k_1(A-C_1)+C_2$$

$$R'=k_{03}(R-A)+k_1(A-C_1)+C_2 \qquad (14)$$

where the coefficients $k_{01}$, $k_{02}$ and $k_{03}$ are positive real numbers specified in accordance with the color signals; $C_1$ and $C_2$ are constants specified by the color transforming system or the image to be subjected to color transformation; and A is a function of the color signals (B,G,R) for each signal which satisfies the following equation (11):

$$\min (B,G,R) \leq A \leq \max (B,G,R) \qquad (11)$$

When all of the numerical values of the respective elements (B,G,R) of said color signals coincide and are expressed by a signal value N, the signal value N is preferably a linear function of the logarithm of L, or the luminance of the corresponding gray, and expressed by the following equation (2):

$$N=c_1 \log L + c_2 \qquad (2)$$

where $c_1$ and $c_2$ are constants.

Preferably, said color signals represent any one of equivalent neutral density, integral equivalent neutral density, exposure density, logarithmic exposure and calorimetric density.

When all of the numerical values of the respective elements (B,G,R) of said color signals coincide and are expressed by a signal value N, the signal value N is preferably a linear function of the power number of L, or the luminance of the corresponding gray, and represented by the following equation (3):

$$N=c_1 L^\gamma + c_2 \qquad (3)$$

where the exponent $\gamma$ is a real number satisfying $0<\gamma<1$ and $c_1$ and $c_2$ are constants.

Said color signals are preferably TV monitor signals.

Preferably, said color signals are setup color signals obtained by adjustment of brightness and/or white balance.

According to a second case of the fifth embodiment of the invention, the stated objects can be attained by a color transforming method in which in the color transformation of a color image represented by color signals consisting of components corresponding to blue (B), green (G) and red (R), the color signals for each pixel are transformed using a coefficient that takes a relatively small value when said color signals for each pixel take values satisfying B>G>R, and a relatively large value when B<G<R is satisfied. Said coefficient is a function of said color signals (B,G,R) for each pixel.

BRIEF DESCRIPTION OF THE DRAWINGS

FIGS. 8a and 8b illustrate two exemplary systems for implementing the color transforming method of the invention.

DETAILED DESCRIPTION OF THE INVENTION

The color transforming method of the invention will now be described in detail with reference to the preferred embodiments shown in the accompanying drawings.

Figure 1:
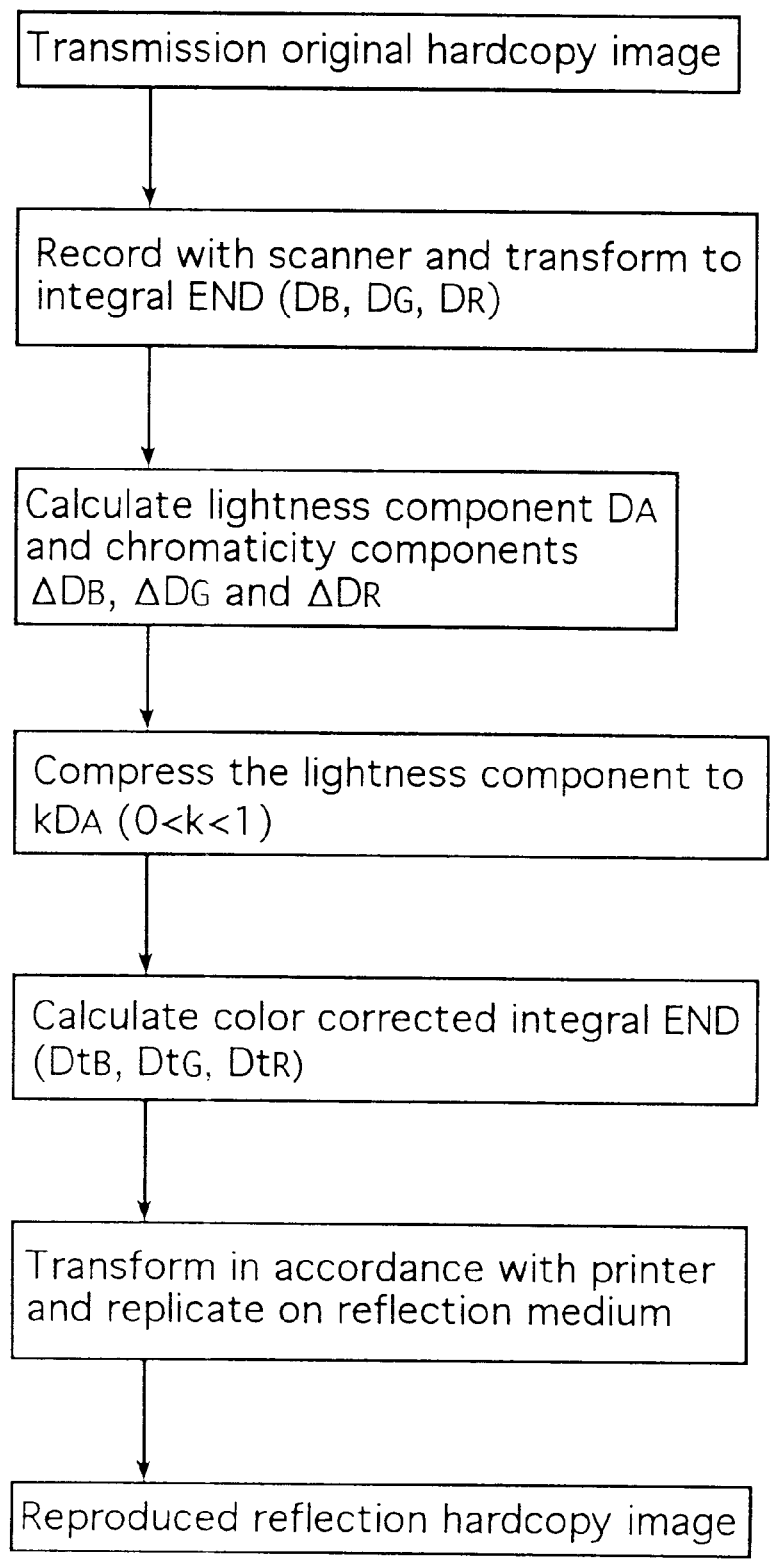
FIG. 1 is a flowchart illustrating a color transforming method according to an embodiment of the invention.

To begin with, the color transforming method according to the second embodiment of the invention is described. FIG. 1 is a flowchart illustrating the color transforming method according to the second embodiment of the invention. As shown, the color transforming method according to the second embodiment of the invention comprises photoelectric scanner reading of an image on a transmission original such as a color positive image exposed on a reversal film, recording the image as original image signals per pixel, and transforming them to signals the three values of which coincide for a plurality of colors visually perceived as gray for each pixel and which are on a logarithmic scale with respect to the intensity of light, as exemplified by equivalent neutral density (hereunder sometimes abbreviated as END) or an integral density extended from this equivalent neutral density which is an analytical density (said extended density is hereunder referred to as an integral equivalent neutral density or integral END).

In the following description of the second embodiment of the invention, the input image on the hardcopy or softcopy is a color positive image on a reversal film; however, the invention is in no way limited to this particular hardcopy and any input will suffice if it can be transformed to the above-defined signals such as END and integral END (hereunder sometimes abbreviated as IND). For example, the invention is also applicable to a system in which a subject is directly imaged with a solid-state imaging device such as CCD, more specifically a digital camera or a video camera, to record it as digital image signals, which are then output on a reflective print, as well as to a system in which a subject is photographed on a color negative film and the resulting color negative image is read with a scanner or CCD to record it as digital image signals, which are then output on a reflective print. In the following description, IND is taken as a representative example of signals the three values of which coincide for a plurality of colors visually perceived as gray for each pixel and which are on a logarithmic scale with respect to the intensity of light. In the following description, the three primaries, blue (B), green (G) and red (R), are also taken as a typical example of three linearly independent colors so that IND is designated by $D_B$, $D_G$ and $D_R$. It should, however, be noted that this is not the sole case of the invention and the combinations of cyan (C), magenta (M) and yellow (Y) or any other three linearly independent colors may of course be substituted.

The next step is a characterizing portion of the invention method and a lightness component and chromaticity components of the respective colors are computed from IND, or $D_B$, $D_G$ and $D_R$.

As already mentioned in connection with the prior art, it is desirable for range compression to be performed in such a way as to satisfy four requirements, i.e., description of highlights and shadows and the preservation of contrast, chroma and hue. In spite of these four requirements to be satisfied, the degrees of freedom that are allowed are three B, G and R. In other words, if the four requirements are independent of one another, they cannot be satisfied simultaneously. In range compression, it is critical to determine which are possible and which are not. In the present invention, fidelity to originals (hardcopy or softcopy images), especially color transparency hardcopy images, is of prime importance, so the preservation of hues and the description of highlights and shadows are performed. For the sake of simplicity, the following description assumes the use of a system of block dyes which have rectangular absorption waveforms and which produce a gray when the densities of B, G and R coincide.

According to color science, hues are given by an antilogarithmic number ratio B:G:R, so in order to preserve hues in terms of density (on a logarithmic scale), one may preserve the density difference between B and G or between G and R. Hence, two degrees of freedom are lost at the cost of hue preservation. Further, the visual perception has such attributes that most of the colors in highlights and shadows are achromatic or near-achromatic. Therefore, if it is possible to extract only the achromatic component of a given color and compress it (render it less contrasty), one may well expect that the description of highlights and shadows can be realized.

Thus, if any given color is separated into a chromaticity component and a lightness component and the former is preserved while the latter is compressed, one can accomplish both the preservation of the hue and the description of the highlights and shadows. Based on this understanding, we write the BGR densities of a given color as $(D_B, D_G, D_R)$ and its lightness as $D_A$ and decompose the $(D_B, D_G, D_R)$ into the following equation (15):

$$\begin{bmatrix} D_B \\ D_G \\ D_R \end{bmatrix} = \begin{bmatrix} D_B - D_A \\ D_G - D_A \\ D_R - D_A \end{bmatrix} + \begin{bmatrix} D_A \\ D_A \\ D_A \end{bmatrix} = \begin{bmatrix} \Delta D_B \\ \Delta D_G \\ \Delta D_R \end{bmatrix} + \begin{bmatrix} D_A \\ D_A \\ D_A \end{bmatrix} \quad (15)$$

where the first term of the right side may be interpreted as representing the chromaticity components whereas the second term as the lightness component.

In this way, the BGR densities of a given color ($D_B$, $D_G$, $D_R$) are decomposed into the chromaticity components in the first term and the lightness component in the second term. Then, the above-described image processing for compressing the lightness component $D_A$ is expressed by the following equation (16) and one can compute the BGR densities subjected to first color transformation (color space compression), namely, the integral END ($D_{rB}$, $D_{rG}$, $D_{rR}$) subjected to first color transformation (hereunder referred to simply as "color correction"):

$$\begin{bmatrix} D_{rB} \\ D_{rG} \\ D_{rR} \end{bmatrix} = \begin{bmatrix} D_B - D_A \\ D_G - D_A \\ D_R - D_A \end{bmatrix} + k \begin{bmatrix} D_A \\ D_A \\ D_A \end{bmatrix} \quad (16)$$

where k is a compression coefficient satisfying 0<k<1.

If the setup condition which requires the brightest point in the reversal original (hardcopy) image to coincide with the white background $D_{rW}$ of the paper which is a reflection medium is taken into account, the following equation (17) holds:

$$\begin{bmatrix} D_{rB} \\ D_{rG} \\ D_{rR} \end{bmatrix} = \begin{bmatrix} D_B - D_A \\ D_G - D_A \\ D_R - D_A \end{bmatrix} + k \begin{bmatrix} D_A - \min_{(xy)} D_A \\ D_A - \min_{(xy)} D_A \\ D_A - \min_{(xy)} D_A \end{bmatrix} + \begin{bmatrix} D_{rW} \\ D_{rW} \\ D_{rW} \end{bmatrix} \quad (17)$$

where $\min_{(xy)} D_A$ represents the minimal value of $D_A$ for all the pixels in the entire image forming area. For the sake of simplicity, the equation (17) is hereunder rewritten in the following simplified form:

$$D_{ri} = D_i - D_A + k(D_A - \min_{(xy)} D_A) + D_{rW},$$

or $$D_{ri}(x,y) = D_i(x,y) - D_A(x,y) + k\{D_A(x,y) - \min_{(xy)} D_A(x,y)\} + D_{rW}$$

where the subscript i represents B, G or R.

This equation actually satisfies the above-described requirements as will be apparent from the following equation (18) which holds for any value of i≠j:

$$D_{ri} - D_{rj} = (D_i - D_A + kD_A - k\min_{(xy)} D_A + D_{rW}) - (D_j - D_A + kD_A - k\min_{(xy)} D_A + D_{rW}) = D_i - D_j \quad (18)$$

Obviously, the difference in density is preserved independently of the definition of lightness. Further, the lightness component has been compressed since $D_{rA} = kD_A < D_A$ or $D_{rA} = k(D_A - \min_{(xy)} D_A) < D_A$. Therefore, if the lightness $D_A$ is defined in some way, the algorithm for the color transforming method of the invention can be established. The definition of lightness will be described more specifically below.

When the color corrected integral END densities ($D_{rB}$, $Dr_G$, $D_{rR}$) have been thusly computed as signals in which only the lightness component ($D_A - \min_{(xy)} D_A$) is compressed, the density signals ($D_{rB}$, $D_{rG}$, $Dr_{rR}$) are converted to output image signals (device dependent data) which are dependent on the printer (i.e., the reflection medium used with the printer) and on the at least three colorants formed on the reflection medium, and the printer then yields a reproduced reflection image as a replication of the image from the transmission original hardcopy image onto the reflection medium. The reproduced image thus replicated on the reflection medium features faithful reproduction of the image from the transmission original hardcopy image, in which the hues are preserved adequately, the highlights and shadows are fully described and only the lightness component has been compressed.

We now describe the method of setting the lightness component $D_A$. In the present invention, given a set of densities ($D_B$, $D_G$, $D_R$) the lightness component $D_A$ is preferably expressed in terms of the maximum, minimum or median value of each of the densities $D_B$, $D_G$ and $D_R$. If the maximum value is used, $D_A$ is expressed as max($D_B$, $D_G$, $D_R$); in the case of the minimum value, $D_A$ is expressed as min($D_B$, $D_G$, $D_R$); for the median value, $D_A$ is expressed as median($D_B$, $D_G$, $D_R$). The "median" designates a function for representing the second largest (or smallest) value for the given set of densities ($D_B$, $D_G$, $D_R$).

In accordance with common knowledge in color science, the lightness $D_A$ should be defined as:

$$D_A = -\log\{0.1 \cdot T_B + 0.6 \cdot T_G + 0.3 \cdot T_R\}$$

$$= -\log\{0.1 \cdot 10^{-DB} + 0.6 \cdot 10^{-DG} + 0.3 \cdot 10^{-DR}\}$$

However, this definition is not universal enough to explain all visual phenomena. For example, the Helmholtz-Kohlrausch effect, the Hunt effect and the Bézold-Brücke effect cannot be explained by this definition. Many various models on lightness have so far been reviewed but as of today no single model has been found that can explain all visual phenomena.

Therefore, in the present invention, lightness is defined in terms of zero base.

Returning to the lightness $D_A$, it must at least satisfy the following inequality:

$$\min\{D_B, D_G, D_R\} \leq D_A \leq \max\{D_B, D_G, D_R\}$$

First, in order to secure the maximum and minimum values, both $\min\{D_B, D_G, D_R\}$ and $\max\{D_B, D_G, D_R\}$ maybe adopted as definitions of lightness.

To those who are familiar with the CIE color system, this may be a rather strange way to define lightness but from the stand-point of the Ostwald system in which all colors are described in terms of the ratio between white, black and pure colors, this is a quite natural way. Thus, $\min\{D_B, D_G, D_R\}$ corresponds to the black content and $\max\}D_B, D_G, D_R\}$ to the white content.

It should be noted here that the Ostwald system is dealt with as a base in the German Industrial Standards (DIN) whereas $\min\{D_B, D_G, D_R\}$ is called "under color" in the printing industry and used to create a black printer (for under color removal or UCR). In this sense, both definitions are well established in the art.

Yet these definitions refer to the maximum and minimum values that can be taken by lightness and there is no denying that lightness is either overestimated or underestimated. To deal with this problem, we derive a third definition of lightness a posteriori from the appearances of colors.

If lightness $D_A$ is specified, a chromaticity vector $\Delta D_i$ is determined by the following equation (19):

$$\begin{bmatrix} \Delta D_B \\ \Delta D_G \\ \Delta D_R \end{bmatrix} = \begin{bmatrix} D_B - D_A \\ D_G - D_A \\ D_R - D_A \end{bmatrix} \quad (19)$$

If $\Delta D_B$, $\Delta D_G$ and $\Delta D_R$ are assumed to have the following correlationships in interpretation with three primary colors and gray:

$\Delta D_B > 0 \Leftrightarrow$ Y (yellow), $\Delta D_G > 0 \Leftrightarrow$ M (magenta),
$\Delta D_R > 0 \Leftrightarrow$ C (cyan)

$\Delta D_B = 0 \Leftrightarrow N$ (neutral), $\Delta D_G = 0 \Leftrightarrow$ neutral, $\Delta D_R = 0 \Leftrightarrow$ neutral $\Delta D_B < 0 \Leftrightarrow B$ (blue), $\Delta D_G < 0 \Leftrightarrow G$ (green), $\Delta D_R < 0 \Leftrightarrow R$ (red)

any chromaticity vector can be correlated to color interpretation. In the above correlationships, the designation P→Q refers to the proposition that "Q if P". The color interpretation system under discussion is characterized by the following two features: no two interpretations that are complementary to each other appear simultaneously; and only two hues that are adjacent on a hue circle can appear simultaneously. This is a model of interpretations that is essentially equivalent to the model of opponent colors which Hering postulated in connection with the color appearance.

If lightness is specified according to this interpretation system, the interpretation of a given color, or its appearance, is determined. For example, if lightness $D_A$ is defined as $\min\{D_B, D_G, D_R\}$, the skin color is interpreted as follows. Noting $D_B > D_G > D_R$, we obtain $$\begin{bmatrix} \Delta D_B \\ \Delta D_G \\ \Delta D_R \end{bmatrix} = \begin{bmatrix} D_B - D_A \\ D_G - D_A \\ D_R - D_A \end{bmatrix}$$

$$= \begin{bmatrix} D_B - \min_{(xy)} D_i \\ D_G - \min_{(xy)} D_i \\ D_R - \min_{(xy)} D_i \end{bmatrix} = \begin{bmatrix} D_B - D_A \\ D_G - D_A \\ D_R - D_A \end{bmatrix}$$

$$= \begin{bmatrix} + \\ + \\ 0 \end{bmatrix} \Leftrightarrow \begin{bmatrix} \text{yellow} \\ \text{magenta} \\ \text{neutral} \end{bmatrix}$$

Hence, the skin color is interpreted as yellow magenta on the assumption of $D_A = \min_{(xy)} D_i$. Thus, the interpretation of chromaticity is specified if lightness is specified; conversely, if the interpretation of chromaticity is specified, the definition of lightness is derived.

In terms of color perception, the skin color is apparently perceived as yellow red; hence, the following relationship must be satisfied:

$$\text{Skin color} \Rightarrow \begin{bmatrix} \text{yellow} \\ \text{neutral} \\ \text{red} \end{bmatrix} \Leftrightarrow \begin{bmatrix} \Delta D_B > 0 \\ \Delta D_G = 0 \\ \Delta D_R < 0 \end{bmatrix} \Rightarrow D_A = D_G$$

Speaking of yellow green, it is literally perceived as yellow green; hence:

$$\text{Yellow green} \Rightarrow \begin{bmatrix} \text{yellow} \\ \text{green} \\ \text{neutral} \end{bmatrix} \Leftrightarrow \begin{bmatrix} \Delta D_B > 0 \\ \Delta D_G < 0 \\ \Delta D_R = 0 \end{bmatrix} \Rightarrow D_A = D_R$$

The color of blue sky is perceived as cyan blue; hence:

$$\text{Blue sky color} \Rightarrow \begin{bmatrix} \text{blue} \\ \text{neutral} \\ \text{cyan} \end{bmatrix} \Leftrightarrow \begin{bmatrix} \Delta D_B < 0 \\ \Delta D_G = 0 \\ \Delta D_R > 0 \end{bmatrix} \Rightarrow D_A = D_G$$

In other words, lightness compatible with color appearance can be defined by adopting the definition of lightness which satisfies the following relationships:

skin color → $D_B > D_G > D_R$ → $D_A = D_G$ yellow green → $D_B > D_R > D_G$ → $D_A = D_R$ blue sky color → $D_R > D_G > D_B$ → $D_A = D_G$ It is therefore necessary to give the thus defined lightness as a calculable function and the lightness $D_A$ which provides the above-described interpretation is none other the median value of $\{D_B, D_G, D_R\}$. Therefore, the median value of $\{D_B, D_G, D_R\}$ can be set as lightness $D_A$ for the purposes of the invention. In the field of numerical analysis, arithmetic operations to give the median value are called "median" operations and in compliance with this convention, the following notation is adopted in the present invention:

$$D_A = \text{median}\{D_B, D_G, D_R\}$$

For the sake of simplicity, color compression will be named differently in the following description, depending upon the definition of lightness $D_A$. If $D_A = \max\{D_B, D_G, D_R\}$, the compression is OCC (Over Color Compression); if $D_A = \text{median}\{D_B, D_G, D_R\}$, MCC (Median Color Compression) is used; if $D_A = \min\{D_B, D_G, D_R\}$, the name to be used is UCC (Under Color Compression).

Thus, the lightness component $D_A$ can be set. The foregoing description is simplified in that densities $D_B$, $D_G$ and $D_R$, as well as lightness $D_A$ in the system of block dyes are used to define END and integral END for the same system. It should, however, be noted that the above description is also valid for actual colorants which are not block dyes and it is with such actual colorants, not the block dyes, that the END and integral END used in the present invention should work effectively.

In the foregoing example, the densities ($D_B$, $D_G$, $D_R$) given as the lightness component are illustrated by $\max(D_B, D_G, D_R)$ or $\min(D_B, D_G, D_R)$ or $\text{median}(D_B, D_G, D_R)$; however, these are not the sole examples of the invention and any function will suffice as long as it satisfies $\min(D_B, D_G, D_R) \leq D_A \leq \max(D_B, D_G, D_R)$. For example, $D_A$ may be expressed by the average of densities $D_B$, $D_G$ and $D_R$, namely, $\frac{1}{3}(D_B + D_G + D_R)$.

In the invention, the preservation of hues and the description of highlights and shadows are performed positively; on the other hand, the chroma is not preserved correctly but tends to become somewhat higher than what it should be. Since the slight increase in chroma is generally preferred from the viewpoint of visual perception, the equation (17) should suffice for performing the transformation which is the most characterizing aspect of the invention. However, if there is the need for chroma adjustment, the equation (17) is preferably replaced by the following equation (20) using parameters $k_0$ and $k_1$ which satisfy $0 < k_1 < k_0 \leq 1$:

$$D_{ri} = k_0(D_i - D_A) + k_1(D_A - \min_{(xy)} D_A) + D_{rW}$$

$$D_{ri}(x,y) = k_0\{D_i(x,y) - D_A(x,y)\} + k_1\{D_A(x,y) - \min_{(xy)} D_A(x,y)\} + D_{rW} \quad (20)$$

where parameter $k_1$ is a compression coefficient which has the same meaning as compression coefficient k in the equation (17).

Parameter $k_1$ (or k) which is also referred to as a lightness coefficient may be set at appropriate values that satisfy $0 < k_1(k) < 1.0$ in accordance with the dynamic density range of the input image on the hardcopy or softcopy (e.g. a color positive image on a reversal film) or the subject, as well the dynamic range of the densities that can be reproduced on the output reflection print. Considering the dynamic density range ratio for the case where the image on a reversal film is output as a reflection print, human vision and other factors, the parameter $k_1$ (or k) is preferably set at a numerical value within the range that satisfies $0.7 < k_1$ (or k)<1.0. More preferably, parameter $k_1$ (or k) is within a range that satisfies $0.75 \leq k_1$ (or k)$\leq 0.9$. Speaking of parameter $k_0$ (also called chroma coefficient), it is not limited to any particular value and may appropriately be set in accordance with the increase in the chroma of the reflection print to be reproduced or it may be set at visually the best value; in a typical case, the parameter $k_0$ is preferably equal to or greater than the compression coefficient $k_1$, satisfying $k_1 \leq k_0 \leq 1.0$. It should also be noted that parameters $k_0$ and $k_1$ are in no way limited to constants and may be varied in accordance with (B,G,R) so that nonlinear transformation is performed as in the case of S-shaped curve which is employed for silver halide photographic materials.

In the foregoing example, in order to accommodate the white background $D_{rW}$ of a reflection medium such as a reflection print paper, $\min_{(xy)} D_A$ which is the smallest value that can be taken by the lightness component is used to represent the brightest point (pixel point represented as x and y coordinates) in the image on the original (hardcopy/softcopy image). This is not the sole case of the invention and a constant which does not depend directly upon the lightness component $D_A$ of the image on the original may be substituted, with the value being selected from the range of 0.0–0.3, preferably 0.1–0.2. The specific value of this constant depends on various factors including the environment for exposure of the subject such as the exposure light source, the base density of the transparent medium as the original on which the input image is formed, the transparent medium per se and the three or more colorants it uses, as well as on the reflection medium such as a reflection print and the colorants it uses, which may be taken into account as required. As already mentioned, the constant may appropriately be selected from the range of 0.0–0.3.

In the foregoing example, the white background densities $(D_{rW}, D_{rW}, D_{rW})$ of the reflection medium such as a reflection print paper are used as the base density values (signal values such as equivalent neutral densities and integral equivalent neutral densities) of the reflection medium with which the brightest point of the image on the original are brought into agreement. These white background densities are preferably signal values (BW, GW, RW) such as END and integral END which are obtained by reading with the original image recorder such as a scanner or CCD and subsequent transformation. The white background density $D_{rW}$ of the reflection medium may be expressed by one of the thus determined density values BW, GW and RW. Alternatively, the white background or base density of the reflection medium may directly be measured with a densitometer, preferably a visual densitometer, to yield a value VW which is used to express the white background density $D_{rW}$.

Described above are the basic features of the color transforming method according to the second embodiment of the invention. In the present invention, the subject or the image on an original is transformed to signals, such as END or integral END, the three values of which coincide for a plurality of colors visually perceived as gray for each pixel and which are on a logarithmic scale with respect to the intensity of light; the signals are then subjected to the first color transformation by the method of the invention to perform range compression for producing color corrected signals such as color corrected END or integral END; subsequently, the color corrected signals are subjected to second color transformation to produce second color transformed image data signals which depend on the output reflection medium (e.g. reflection print) and the colorants it uses, namely, on the printer which outputs the reflection print. The transformation of the subject or the image on an original to the three signals defined above, as well as the second color transformation may be performed by any method but the use of lookup tables is preferred.

Let us first describe the methods of constructing a lookup table LUT1 for producing the above-defined three signals such as END or integral END, and another lookup table LUT2 for effecting the second color transformation.

A gray scale is formed on the transparent medium such as a reversal film which is to be used in the invention and which comprises at least three colorants and the transmission density of the gray scale is measured at more than one point with a scanner having three linearly independent spectral sensitivities and a densitometer having a fourth sensitivity. The scanner is preferably equipped with ISO narrow-band filters typically having three peak wavelengths at 436 nm (B), 546 nm (G) and 644 nm (R) so that it is capable of density measurement at three linearly independent sensitivities B, G and R. The densitometer having a fourth sensitivity is preferably a visual densitometer.

The scanner-measured transmission density is plotted on the horizontal axis for each of B, G and R whereas the densitometer-measured transmission density is plotted on the vertical axis for each of B, G and R, thereby constructing the first lookup table LUT1 for transforming the original image signals for the scanner-recorded image on the original to END or integral END. The first lookup table LUT1 is composed of three one-dimensional lookup tables $LUT1_B$, $LUT1_G$ and $LUT1_R$ for B, G and R, respectively. The scanner-measured transmission density is a scanner-measured analytical density if the original image signals are to be transformed to END, and it is a scanner-measured integral density in the case of integral END.

Similarly, a gray scale is formed for the reflection medium and its reflection density is measured with the above-described scanner and visual densitometer; for each of B, G and R, the scanner-measured reflection density is plotted on the vertical axis and the densitometer-measured reflection density on the horizontal axis, thereby constructing the second lookup table LUT2 with which the color corrected END or integral END densities for the reflection medium are converted to the second color transformed signals for outputting a reflection print. As in the case of the first lookup table LUT1, the second lookup table LUT2 is also composed of three one-dimensional lookup tables designated $LUT2_B$, $LUT2_G$ and $LUT2_R$. As in the case of the transmission density, the scanner-measured reflection density is either a scanner-measured analytical density (if the original image signals are to be transformed to END) or a scanner-measured integral density (in the case of integral END). This is how the first and second lookup tables LUT1 and LUT2 are preliminarily constructed.

With the use of these first and second lookup tables LUT1 and LUT2, the color transforming method of the invention is implemented in the following manner. First, the color positive image formed on a reversal film is read with a scanner and the obtained original image signals are transformed to scanner-measured integral (or analytical) densities (B1,G1,R1) for each pixel. The resulting scanner integral (or analytical) densities (B1,G1,R1) are transformed to measured integral END (or simply END) densities (B2,G2,R2) in accordance with the following set of equations (6) with the intermediary of the first lookup table LUT1:

$B2 = LUT1_B(B1)$ $G2 = LUT1_G(G1)$ $R2 = LUT1_R(R1)$ (6)

Subsequently, the integral END (or simply END) densities (B2,G2,R2) for each pixel are transformed to color corrected integral END (or color corrected END) densities (B3,G3,R3) for each pixel in accordance with the following set of equations (5):

$$B3 = k_0(B2-A) + k_1(A - \min_{(x,y)} A) + BW$$

$$G3 = k_0(G2-A) + k_1(A - \min_{(x,y)} A) + GW$$

$$R3 = k_0(R2-A) + k_1(A - \min_{(x,y)} A) + RW \quad (5)$$

The equations (5) are identical to the equations (16), except that $D_{ri}$ ($D_{rB}$, $D_{rG}$, $D_{rR}$) is replaced by (B3,G3,R3), $D_i$ ($D_B$, $D_G$, $D_R$) by (B2,G2,R2), $D_A$ by A, and $D_{rW}$, ($D_{rW}$, $D_{rW}$, $D_{rW}$) by (BW,GW,RW).

Therefore, in equations (5), A is the lightness component specified for the integrated END (or simply END) densities (B2,G2,R2) and it is a function satisfying min{B2,G2,R2} ≤ A ≤ max{B2,G2,R2}, $k_0$ and $k_1$ are constants satisfying $0 < k_1 < k_0$, (BW,GW,RW) are the values obtained by performing inverse transform on the scanner-measured base densities of the reflection medium by means of the second lookup table LUT2, and $\min_{x,y} A$ of course represents the minimum value of A for all pixels (x,y) in the entire image forming area.

In the case under consideration, the lightness component A is either OCC (A=max{B2,G2,R2}) or UCC (A=min{B2,G2,R2}) or MCC (A=median{B2,G2,R2}).

Finally, the color corrected integral END (or color corrected END) densities (B3,G3,R3) are transformed to integral (or analytical) densities (B4,G4,R4) which are the second color transformed signals of the invention in accordance with the following set of equations (7) with the intermediary of the preliminarily constructed second lookup table LUT2 and the integral (or analytical) densities (B4,G4,R4) are output to a printer which then yields a reflection print:

$$B4 = LUT2_B(B3)$$

$$G4 = LUT2_G(G3)$$

$$R4 = LUT2_R(R3) \quad (7)$$

provided that if the integral (or analytical) densities B4, G4 and R4 are greater than the maximum density of said reflection medium or smaller than its minimum density, the densities have to be clipped to said maximum or minimum value, respectively.

The thus obtained reflection print is a reflection original which is a faithful reproduction of the image on an original, particularly the image on a transmission original.

The above-described color transforming method according to the second embodiment of the invention is for creating a reflection original faithful to the image on the original, so if the input image on the original has the appropriate colors and densities, namely, if it is an image having good color and density balances, the output image on the reflection original also has the appropriate colors and densities and can be worked up to an image having good color and density balances. In fact, however, not all of the images on the originals delivered from users have the appropriate colors and densities or good color and density balances. For example, users bring in transmission positive originals such as reversal films or transmission negative originals such as color negative films and most of the images on these originals have the appropriate color and density balances but one to two tenths of them are said to be upset in the color and density balances.

Therefore, if the color transforming method of the invention is immediately applied to such unbalanced originals, the images reproduced on the output reflection prints will retain the upset color and density balances.

Under the circumstances, if a user has brought in an original that is upset in color and density balances, the color transforming method of the invention is not immediately applied; instead, in order to correct the color and density balances of the photoelectrically read image data on the original, setup need be performed so that the input image data on the original are transformed to original image signals having the appropriate balances.

On the pages that follow, we will explain the method of setting up that can be practiced in the invention. In the embodiment under consideration, the scanner-measured integral (or analytical) densities (B1,G1,R1) of the input image on the original are transformed to integral END (or simply END) densities ($B2_0, G2_0, R2_0$) in accordance with the following set of equations (8) with the intermediary of the above-described first lookup table LUT1:

$$B2_0 = LUT1_B(B1)$$

$$G2_0 = LUT1_G(G1)$$

$$R2_0 = LUT1_R(R1) \quad (8)$$

Subsequently, the integral END (or simply END) densities ($B2_0, G2_0, R2_0$) are set up by the following set of equations (9) to determine integral END (or simply END) densities (B2,G2,R2):

$$B2 = B2_0 - BS + AS$$

$$G2 = G2_0 - GS + AS$$

$$R2 = R2_0 - RS + AS \quad (9)$$

where BS, GS and RS are values that satisfy:

$$\min_{(x,y)} B2_0 \leq BS \leq \max_{(x,y)} B2_0$$

$$\min_{(x,y)} G2_0 \leq GS \leq \max_{(x,y)} G2_0$$

$$\min_{(x,y)} R2_0 \leq RS \leq \max_{(x,y)} R2_0$$

where $\min_{(x,y)} B2_0$, $\min_{(x,y)} G2_0$ and $\min_{(x,y)} R2_0$ represent the minimum values of $B2_0$, $G2_0$ and $R2_0$ for all the pixels in the entire image forming area, and $\max_{(x,y)} B2_0$, $\max_{(x,y)} G2_0$ and $\max_{(x,y)} R2_0$ are the maximum values of $B2_0$, $G2_0$ and $R2_0$ for all the pixels in the entire image forming area.

In equations (9), AS is a real number specified by BS, GS and RS and may be exemplified by max{BS,GS,RS}.

The thus set up integral END (or set up END) densities (B2,G2,R2) are subjected to the color transformation for range compression in accordance with the procedures already described above and a reflection print is output. The resulting reflection output reproduces an image having good color and density balances even if it is obtained from the transmission original which is upset in the color and density balances.

In the example just described above, the scanner-measured integral (or analytical) densities are transformed to integral END (or simply END) densities, which are then set up. This is not the sole case of the invention and any other method of setting up may be employed as long as they are capable of correcting the color and density balances in the image signals from the original image; for example, any known methods of setting up may be adopted, as exemplified by one which is applied to the scanner-measured integral (or analytical) densities.

Figure 2:
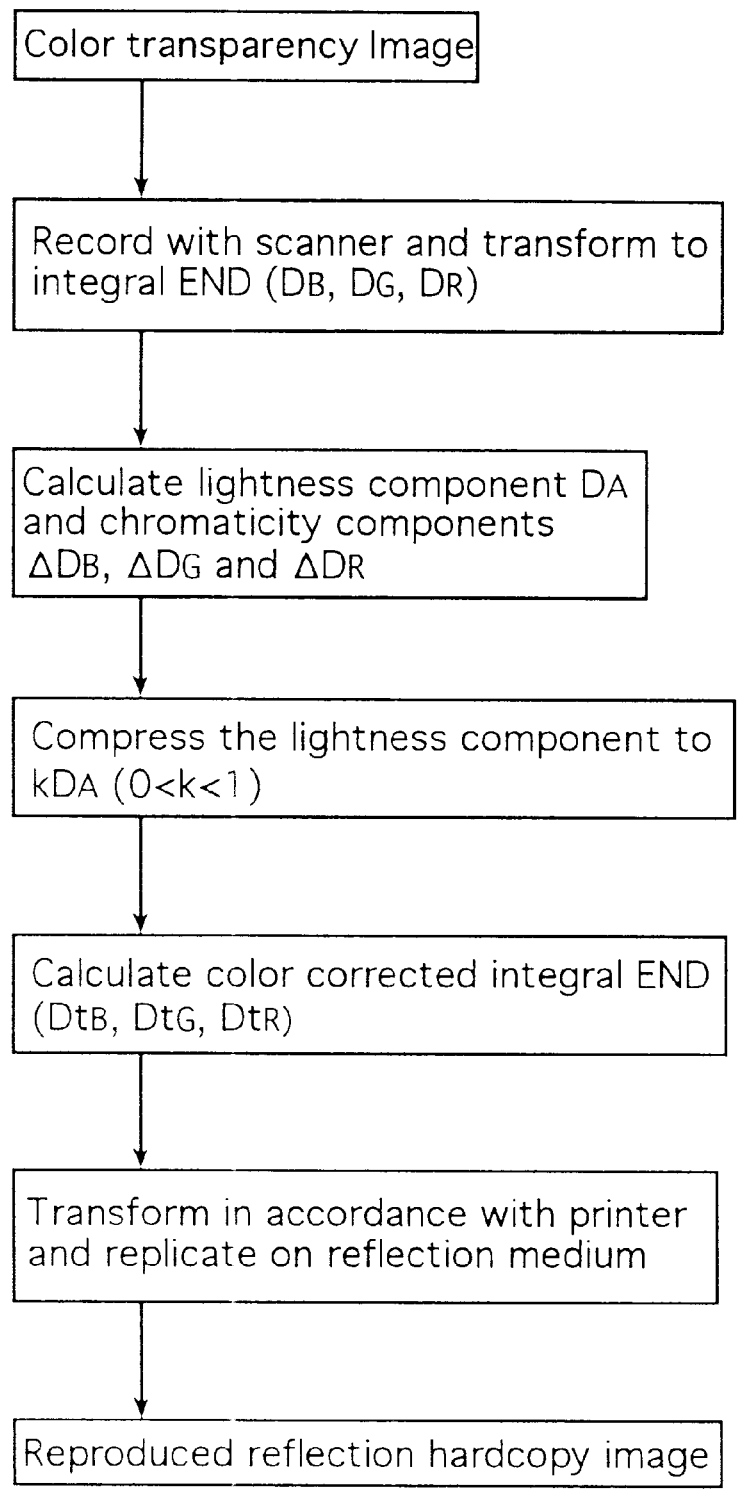
FIG. 2 is a flowchart illustrating a color transforming method according to another embodiment of the invention.

The foregoing description assumes as a representative case the system in which the color positive image formed on the transparent medium comprising at least three colorants is used as the image on the original, the signals for this original image which is recorded for each pixel by means of a scanner having three linearly independent spectral sensitivities are transformed to scanner-measured integral densities, which are then transformed to three-color integral END densities for use in color transformation for range compression. This is not the sole case of the invention and as shown in FIG. 2 (and as parenthesized in the foregoing discussion), the invention may of course be applied to a system in which the original image signals for a transmission positive image which is recorded with a scanner per pixel are transformed to scanner-measured analytical densities, which are then transformed to three-color END densities for use in color transformation for range compression.

Other applicable systems include one in which original image signals per pixel that are obtained by direct recording of the subject with a solid-state imaging device such as a CCD which has three linearly independent spectral sensitivities are used as input signals from the original and transformed to exposure densities measured with the solid-state imaging device, which exposure densities are then transformed to three-color integral END densities for use in color transformation for range compression, as well as one in which the subject is photographed on a color negative film having three linearly independent spectral sensitivities and transformed to exposure densities per pixel dependent on the color negative film by means of an auxiliary scanner or solid-state imaging device, which exposure densities are transformed to three-color integral END densities for use in color transformation for range compression.

The exposure densities are those integrated by the spectral sensitivities of the imaging light-sensitive material or device for the subject; on the other hand, they have such a property that their values coincide for a gray subject; therefore, the exposure densities are equivalent to the equivalent neutral densities integrated by the aforementioned spectral sensitivities; in other words, conversion from exposure densities to integral equivalent neutral densities is identity transformation (y=x).

In the foregoing example, the first and second lookup tables LUT1 and LUT2 are constructed and to this end, the transmission and reflection densities of the gray scales formed on the transparent and reflection media, respectively, are measured with the densitometer, preferably a visual densitometer, having a fourth spectral sensitivity for B, G and R in the scanner. This is not the sole case of the invention and it goes without saying that the visual densitometer need not be employed and any means may be adopted as long as they are capable of measuring the visual transmission and reflection densities of the gray scales or concentrations that can be regarded as equivalent to these densities. If desired, the densitometer may be replaced by any one of B, G and R in the scanner.

In the foregoing example, in order to construct the first and second lookup tables LUT1 and LUT2, the transmission and reflection densities of the gray scales formed on the transparent and reflection media, respectively, are measured actually with the scanner and the densitometer; however, this also is not the sole case of the invention and any other means may be employed as long as they can measure the scanner transmission and reflection densities, as well as the visual transmission and reflection densities obtained from the gray scales formed on the transparent and reflection media or any densities that may be regarded as being equivalent to these densities. There is no particular need to use the gray scales formed on the transparent and reflection media and the densitometer can of course be dispersed with.

In one alternative case, the first and second lookup tables LUT1 and LUT2 may be constructed in the following manner.

First, the spectral absorption waveforms of the three colorants in each of the transparent and reflection media are measured and a spectral absorption waveform which will produce a gray, for example, a calorimetric gray (a*=b*=0 in the Lab space) under a light source S($\lambda$) (which waveform is hereunder referred to as a "gray waveform") is generated for more than one lightness value. In the next step, the generated gray waveforms are integrated by a spectral luminous efficiency curve V($\lambda$) and the spectral absorption waveforms of the filters in the scanner B($\lambda$), G($\lambda$) and R($\lambda$) to construct data for optical densities $D_V$, $D_B$, $D_G$ and $D_R$. If one of the gray waveforms is written as $f(\lambda)$, the optical densities $D_V$, $D_B$, $D_G$ and $D_R$, are given by the following set of equations (10). For each of the transparent and reflection media, the optical density $D_V$ thus obtained is plotted on the vertical axis while the other optical densities $D_B$, $D_G$ and $D_R$, are plotted on the horizontal axis, thereby constructing the first lookup table LUT1 for the transparent medium and the second lookup table LUT2 for the reflection medium:

$$D_V = \log_{10} \int_{380}^{780} V(\lambda)S(\lambda)d\lambda - \log_{10} \int_{380}^{780} f(\lambda)V(\lambda)S(\lambda)d\lambda \quad (10)$$

$$D_B = \log_{10} \int_{380}^{780} B(\lambda)S(\lambda)d\lambda - \log_{10} \int_{380}^{780} f(\lambda)B(\lambda)S(\lambda)d\lambda$$

$$D_G = \log_{10} \int_{380}^{780} G(\lambda)S(\lambda)d\lambda - \log_{10} \int_{380}^{780} f(\lambda)G(\lambda)S(\lambda)d\lambda$$

$$D_R = \log_{10} \int_{380}^{780} R(\lambda)S(\lambda)d\lambda - \log_{10} \int_{380}^{780} f(\lambda)R(\lambda)S(\lambda)d\lambda$$

Figure 4:
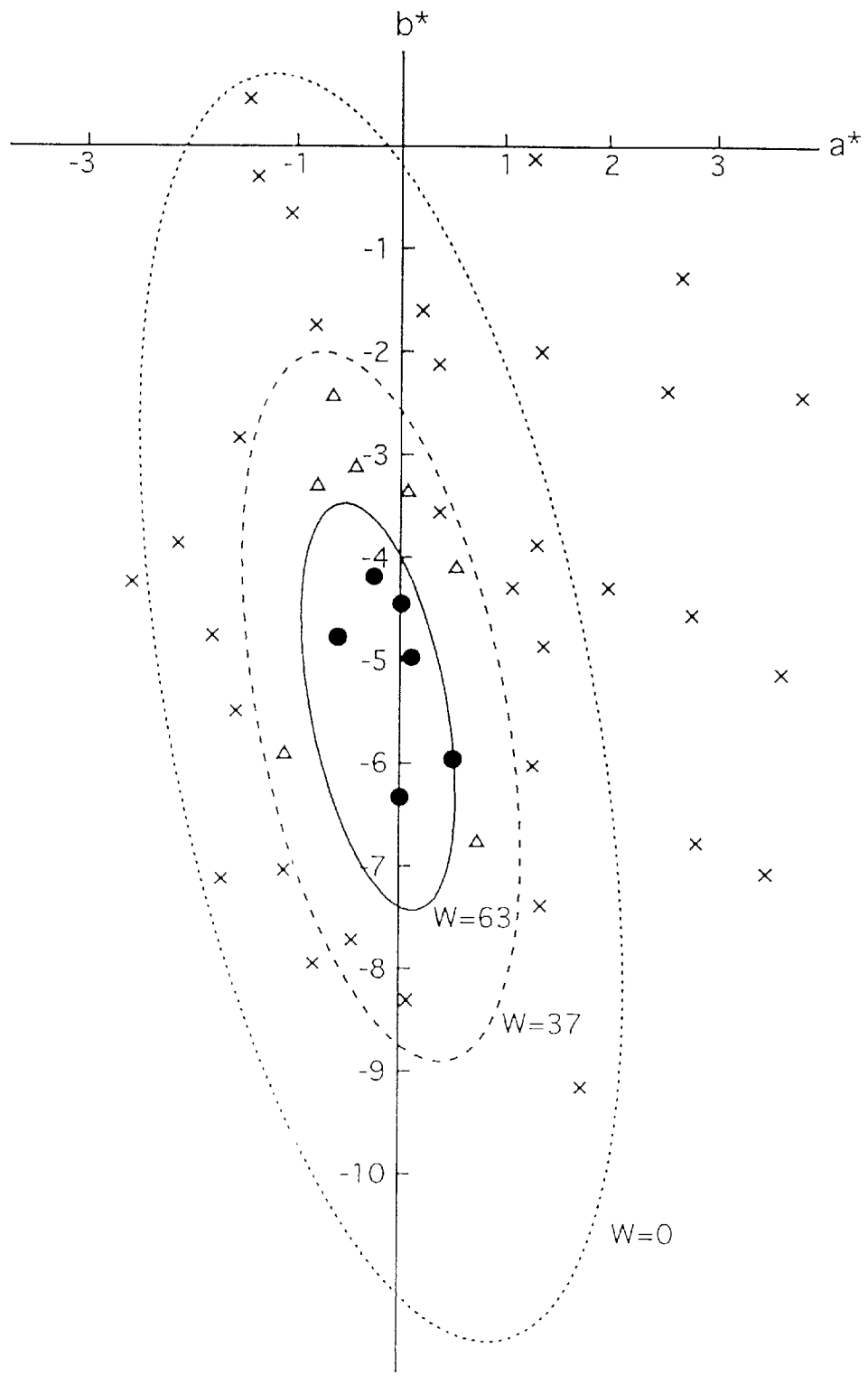
FIG. 4 is a graph exemplifying grays preferred for use in constructing the lookup tables to be used in the color transforming method of the invention.

In the foregoing example, a colorimetric gray is used as the gray scale or gray to construct the first and second lookup tables LUT1 and LUT2; however, this is not the sole case of the invention and any grays may be employed as long as they are visually perceived to be the most achromatic (neutral). For the purposes of the invention, the calorimetric gray is not visually the best and it is preferred to use the visually most preferred grays which are a little shifted from the colorimetric gray (a*=b*=0) to the negative side of the b* axis of the L*a*b* space shown in FIG. 4 and which are within the region bounded by the dotted line; more preferably, the grays within the region surrounded by the dashed line are used and most preferably, the grays within the region surrounded by the solid line should be used.

Having described the basic features of the color transforming method according to the second embodiment of the invention, we now describe a color transforming method according to the first embodiment of the invention.

In the second embodiment of the invention, the input is a subject or an image on a transmission original and the image signals to be processed by the color transformation algorithm in the color transforming process of the invention are signals, such as END or integral END densities, multiple colors of which are visually perceived as gray coincide and which are on a logarithmic scale with respect to the intensity of light. This is not the sole case of the invention and it may be extended to signals such as TV monitor signals multiple colors of which are visually perceived as gray and which are on a power scale with respect to the intensity of light. It is also possible in the invention to extend the color transformation algorithm from the one for compressing a color space to one for compressing and extending the color space.

Thus, in the color transforming method according to the first embodiment of the invention, the digital image signals to be processed by an expanded color transformation algorithm may be defined as image data represented by signals that consist of three mutually independent elements and which, when the values of said elements coincide, provide a color that is visually perceived as gray.

Figure 3:
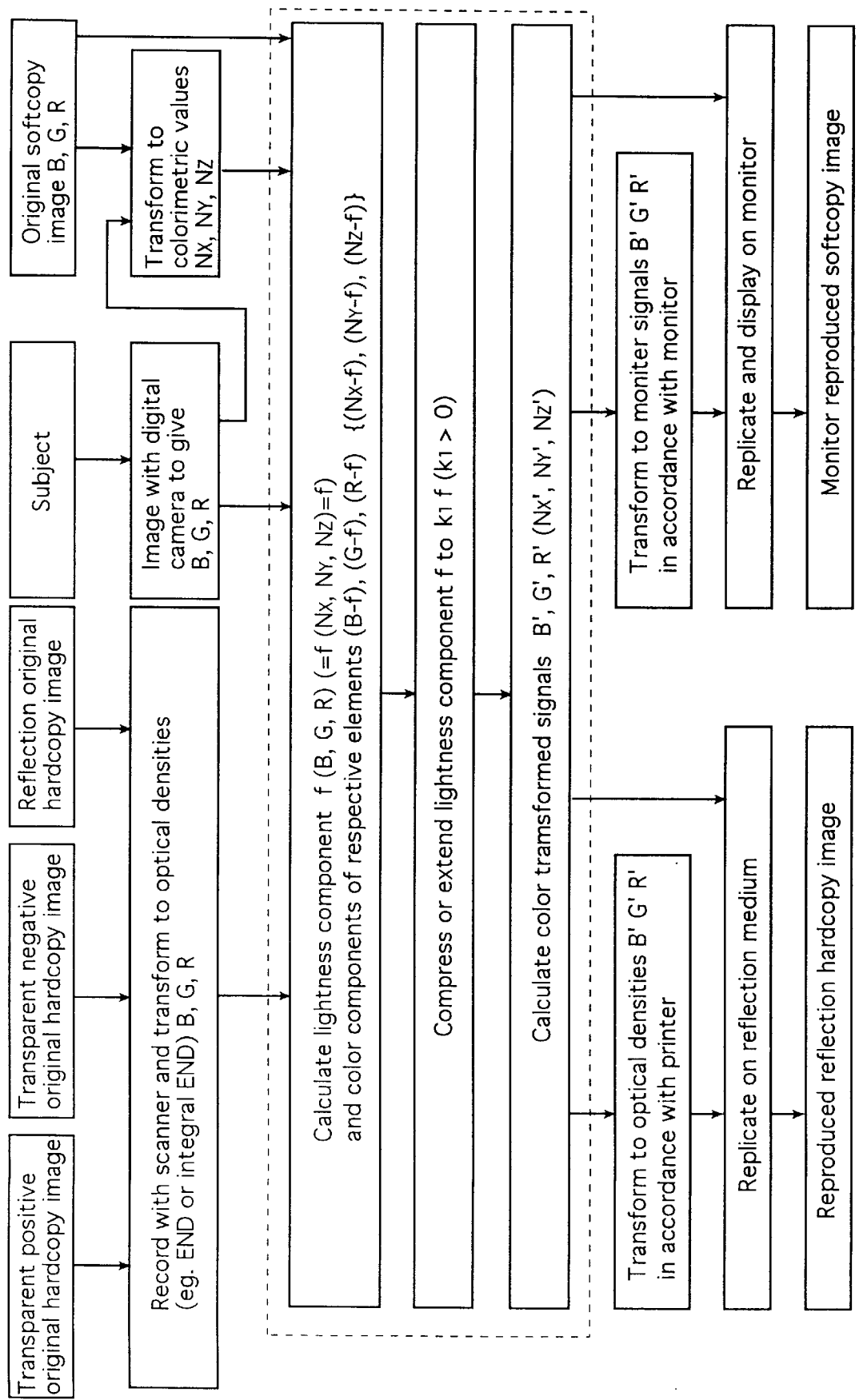
FIG. 3 is a flowchart illustrating a color transforming method according to yet another embodiment of the invention.

The thus defined image data are processed with the image reproducing system shown in FIG. 3 which includes a flow of the expanded color transformation algorithm for the color transforming method according to the first embodiment of the invention. The block delineated by a dashed line in FIG. 3 shows the flow color transformation algorithm for the color transforming method according to the first embodiment of the invention. Except that the lightness component is both compressed and extended, this is identical to the third to fifth steps in the flow color transformation algorithm for the color transforming method according to the second embodiment of the invention which is shown in FIGS. 1 and 2; hence, the individual steps in the expanded color transformation algorithm will not be described here.

As shown in FIG. 3, the color transforming method according to the first embodiment of the invention accommodates various input images including images on transmission originals such as color transparency originals (e.g., reversal films and OHPs) and transparent negative originals (e.g., negative films), images on reflection originals such as photographic prints and lithographic print, subjects per se, as well as images monitor displayed on display devices such as CRTs and LCDs, and images projection displayed as with video projectors. In short, any images can be processed by the first embodiment of the invention as long as they can provide, either directly or after recording or photographing or imaging (in the latter case, either directly or through transformation), image data represented by signals that consist of three mutually independent elements and which, when the values of said elements coincide, provide a color that is visually perceived as gray.

If the input image is an image on a color transparency original, a transparent negative original or a reflection original, the same procedure as in the second embodiment shown in FIGS. 1 and 2 is followed; the input image is recorded with a scanner (e.g., a scanner for transmission originals, as well as a scanner for reflection originals) or a solid-state imaging device (e.g., CCD) and transformed to optical densities for each pixel, which are further converted to equivalent neutral densities (END) or integral equivalent neutral densities (integral END or IND).

Thus, in the exemplary case just mentioned above, the input image data are represented by signals such as END or IND which consist of three mutually independent elements and which, when the values of said elements coincide, provide a color that is visually perceived as gray. Suppose here that the three elements are R, G and B and that the numerical values of the respective elements of these three image data signals coincide and are expressed by a signal value N (B=G=R=N). Then, the signal value N is expressed by a linear function of the logarithm of L, or the luminance of the corresponding gray, and expressed by the following equation (2):

$$N = c_1 \log L + c_2 \quad (2)$$

where $c_1$ and $c_2$ are coefficients.

The image data signals expressed on the logarithmic scale may be any signals of such a type that the signal value N for the gray provided when the numerical values of all signal elements coincide is expressed by the equation (2); specific examples include not only the END and IND mentioned above but also exposure density, logarithmic exposure and colorimetric density.

If the input image is a subject directly imaged with a digital camera or video camera, or an image monitor displayed on a display device such as a CRT or LCD or an image projection displayed on a video projector or the like, digital image data signals B, G and R can directly be obtained. Thus, in this exemplary case, the input image data are represented by digital signals which consist of three mutually independent elements B, G and R and which, when the values of said elements coincide, provide a color that is visually perceived as gray. These input signals are such that when the numerical values of the respective elements B, G and R coincide and are represented by a signal value N (B=G=R=N), the signal value N is expressed by a linear function of the power number of L, or the luminance of the corresponding gray, and expressed by the following equation (3):

$$N = c_1 L^\gamma + c_2 \quad (3)$$

where the exponent $\gamma$ is a real number satisfying $0 < \gamma < 1$ and $c_1$ and $c_2$ are coefficients.

The image data signals expressed on the power scale may be any signals of such a type that the signal value N for the gray provided when the numerical values of all signal elements coincide is expressed by the equation (3); specific examples include output signals from digital cameras, video cameras and the like that can be displayed on monitors, signals from monitors and signals from video projectors. In the case of signals from monitors, the exponent $\gamma$ is selected from the range of 1/1.95 to 1/2.4 and a typical value may be 1/2.2.

If desired, the digital image data signals B, G and R to be displayed on digital cameras, monitors and the like may be transformed to, for example, tristimulus values X, Y and Z in the CIEXYZ color system by the following set of equations (21) in accordance with, for example, CCIR-rec709 (Consultative Committee on International on Radio Recommendation 709) and the resulting tristimulus values X, Y and Z are transformed by, for example, the following set of equations (22) to yield signals $N_X$, $N_Y$ and $N_Z$ which are approximately expressed on a power scale; these signals may be used as the image data to be processed by the color transforming method in accordance with the first aspect of the invention which are represented by signals that consist of three mutually independent elements and which, when the values of said elements coincide, provide a color that is visually perceived as gray:

$$\begin{bmatrix} X \\ Y \\ Z \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R^\beta \\ G^\beta \\ B^\beta \end{bmatrix} \quad (21)$$

$$= \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R^{2.2} \\ G^{2.2} \\ B^{2.2} \end{bmatrix}$$

$$N_X = (X/X_0)^{1/3}$$

$$N_Y = (Y/Y_0)^{1/3}$$

$$N_Z = (Z/Z_0)^{1/3} \quad (22)$$

where $X_0$, $Y_0$ and $Z_0$ are tristimulus values for the case when R=G=B is at maximum (255).

As color management has become a common practice today, image data are frequently given by calorimetric values such as L*,a*,b*. In this case, $N_X$, $N_Y$ and $N_Z$ can be determined by the following set of equations (4) which are modifications of transformations from the CIEXYZ color system to the CIEL*a*b* color system by the set of equations (23) also set forth below:

$$L^* = 116(Y/Y_0)^{1/3} - 16$$
$$a^* = 500\{(X/X_0)^{1/3} - (Y/Y_0)^{1/3}\}$$
$$b^* = 200\{(Y/Y_0)^{1/3} - (Z/Z_0)^{1/3}\} \quad (23)$$
$$N_X = (X/X_0)^{1/3} = (L^* + 16)/116 + a^*/500$$
$$N_Y = (Y/Y_0)^{1/3} = (L^* + 16)/116$$
$$N_Z = (Z/Z_0)^{1/3} = (L^* + 16)/116 - b^*/200 \quad (4)$$

As a result of these transformations, $N_X$, $N_Y$ and $N_Z$ provide a calorimetric gray when their numerical values coincide and the value of coincidence is the cube root of the luminance of the corresponding ray. Hence, the color transforming method of the invention is readily applicable to this case.

A word must be said about the image data signals to be processed by the color transforming method of the invention. As already mentioned, they can be either signals that are expressed on a logarithmic scale or those which are expressed on a power scale. It is recognized in color science and well known that the human sensation of lightness can be expressed either by the logarithmic law, for example, the visual density commonly employed in evaluation of photographs and the like, or by the power law with respect to the luminance of the subject; in other words, the logarithmic function and the power function have a high degree of similarity. This fact should justify the use of the above-described two kinds of image data signals as input for the color transformation according to the invention.

Thus, the image data signals B, G and R are obtained as input signals to be processed by the color transforming method according to the first embodiment of the invention ($N_X$, $N_Y$ and $N_Z$ may be substituted for B, G and R but in the following description, even in the case where the use of the notation $N_X, N_Y, N_Z$ is appropriate, the notation B,G,R is sometimes used if it is necessary for convenience in explanation). Then, the color transformation algorithm delineated by the dashed line in FIG. 3 is executed according to the first embodiment of the invention.

First, the lightness component f(B,G,R) (=f) is determined and this is defined between max(B,G,R) and min(B,G,R) which are the maximum and minimum values, respectively, of the three-element image data signals B, G and R. Subsequently, the lightness component f(B,G,R) is subtracted from each of the three-element image data signals B, G and R to calculate the chromaticity components of the respective elements, i.e., {B-f(B,G,R)} (=B-f), {G-f(R,G,B)} (=G-f), and {R-f(B,G,R)} (=R-f).

In the next step, depending upon the three image data signals B, G and R, the lightness component f is extended or compressed (namely, amplified or attenuated) to perform dynamic range transformation ($k_1f$) at a specified transformation ratio $k_1$ ($k_1>0$). The ratio of dynamic range transformation $k_1$ ($k_1>0$) is determined in accordance with the three image data signals B, G and R. If $0<k_1<1$, the dynamic range (hence, the color space) is compressed (the lightness component is attenuated); on the other hand, if $k_1>1$, the dynamic range is extended (the lightness component is amplified).

Subsequently, depending upon the three-element image data signals B, G and R, the chromaticity components B-f, G-f and R-f of the three elements are amplified or attenuated at respective specified ratios $k_{01}$, $k_{02}$ and $k_{03}$ ($k_{01}$, $k_{02}$, $k_{03}>0$). This yields color corrected chromaticity components $k_{01}(B-f)$, $k_{02}(G-f)$ and $k_{03}(R-f)$. The dynamic range transformed lightness component $k_1f$ is then added to each of the color corrected chromaticity components $k_{01}(B-f)$, $k_{02}(G-f)$ and $k_{03}(R-f)$ to obtain color transformed image data signals B', G' and R' (or $N'_X$, $N'_Y$ and $N'_Z$). It should be mentioned that the method of color correction is not limited to the above-described simple change in the ratio of amplification or attenuation and other methods such as matrix operations may be employed.

Described above is the way to obtain the image data signals that have been color transformed by the algorithm in accordance with the first embodiment of the invention, which may be expressed by the following set of equations (1):

$$B' = K_{01}\{B - f(B,G,R)\} + k_1\{f(B,G,R) - C_1\} + C_2$$
$$G' = K_{02}\{G - f(B,G,R)\} + k_1\{f(B,G,R) - C_1\} + C_2$$
$$R' = K_{03}\{R - f(B,G,R)\} + k_1\{f(B,G,R) - C_1\} + C_2 \quad (1)$$

where f(B,G,R) is a function that satisfies $\min(B,G,R) \leq f(B,G,R) \leq \max(B,G,R)$ for any set of the three image data signals (B,G,R); the coefficients $k_{01}$, $k_{02}$ and $k_{03}$ and $k_1$ are positive real numbers specified in accordance with the three image data signals B, G and R; $C_1$ and $C_2$ are constants specified by the color transforming system or the image to be subjected to color transformation.

Typically, the coefficients $k_{01}$, $k_{02}$ and $k_{03}$ are described as the ratio for color correcting the chromaticity components of the respective elements, and the lightness coefficient $k_1$ as the ratio for transforming the dynamic range of the lightness component. As for $C_1$ and $C_2$, the stain densities of the input and output media, respectively, may be employed.

If no specific color corrections such as the adjustment of chromaticity and chroma or the reproduction of a preferred color are to be performed, the coefficients of color correction $k_{01}$, $k_{02}$ and $k_{03}$ may assume an identical value $k_0$ (chroma coefficient $k_0>0$). In this case, the set of equations (1) may be rewritten as follows:

$$\begin{bmatrix} B' \\ G' \\ R' \end{bmatrix} = k_0 \begin{bmatrix} B - f(B,G,R) \\ G - f(B,G,R) \\ R - f(B,G,R) \end{bmatrix} + k_1 \begin{bmatrix} f(B,G,R) - C_1 \\ f(B,G,R) - C_1 \\ f(B,G,R) - C_1 \end{bmatrix} + \begin{bmatrix} C_2 \\ C_2 \\ C_2 \end{bmatrix} \quad (24)$$

If faithful color reproduction is to be performed using the image data signals expressed on a logarithmic scale by the set of equations (2) or the image data signals expressed on a power scale by the set of equations (3), the chroma (color correction) coefficient $k_0$ and the lightness coefficient $k_1$ may be set to appropriate values in accordance with the specific color transforming system used. The following Table 1 lists some examples of the relationship between the color transforming system and the preferred range of each of the chroma coefficient $k_0$ and the lightness coefficient $k_1$.

TABLE 1

Color Transforming System and Preferred Range of Chroma
Coefficient and Lightness Coefficient

| Input/Output color transforming system | Chroma coefficient $k_0$ | Lightness coefficient $k_1$ |
|---|---|---|
| Reversal film/reflective print | $1.0 \leq k_0/k_1 \leq 1.3$ | $0.7 \leq k_1 \leq 1.0$ |
| Negative film/reflective print | $0.7 \leq k_0/k_1 \leq 1.3$ | $1.0 \leq k_1 \leq 2.0$ |
| CCD camera/reflective print | $0.7 \leq k_0/k_1 \leq 1.3$ | $1.0 \leq k_1 \leq 2.0$ |
| Monitor/reflective print | $0.7 \leq k_0/k_1 \leq 1.3$ | $1.0 \leq k_1 \leq 2.0$ |

The constant terms $C_1$ and $C_2$ in the sets of equations (1) and (24) are input and output signal values that are correlated to each other. Consider, for example, a negative-paper system in which a negative film is printed on a photographic paper; with this system, it is generally held that a gray having a reflectance of 18% is preferably finished to a gray having a visual density of 0.75. If a print is to be obtained from a reversal film, it is held that the brightest white in the reversal film original is preferably finished to the brightest white on the paper. Therefore, in the former case, $C_1$ assumes a signal value corresponding to the gray of 18% reflectance and $C_2$ assumes a signal value corresponding to the gray of 0.75 in visual density. In the latter case, $C_1$ assumes a signal value corresponding to the brightest white in the reversal film original or the stain or base of the reversal light-sensitive material whereas $C_2$ assumes a signal value corresponding to the white background (stain or base) of the reflection medium (paper).

If the three image data signals which are yet to be color transformed in the first embodiment are written as $N_X$, $N_Y$ and $N_Z$ and the three transformed image data signals as $N'_X$, $N'_Y$ and $N'_Z$, the set of equations (24) may be rewritten as follows:

$$\begin{bmatrix} N'_X \\ N'_Y \\ N'_Z \end{bmatrix} = k_0 \begin{bmatrix} N_X - f(N_X, N_Y, N_Z) \\ N_Y - f(N_X, N_Y, N_Z) \\ N_Z - f(N_X, N_Y, N_Z) \end{bmatrix} + \\ k_1 \begin{bmatrix} f(N_X, N_Y, N_Z) - C_1 \\ f(N_X, N_Y, N_Z) - C_1 \\ f(N_X, N_Y, N_Z) - C_1 \end{bmatrix} + \begin{bmatrix} C_2 \\ C_2 \\ C_2 \end{bmatrix} \quad (25)$$

As in the second embodiment, the lightness component $f(B,G,R)$ (or $f(N_X,N_Y,N_Z)$) to be further processed in the first embodiment may be set to have any value between max$(B,G,R)$ (or max$(N_X,N_Y,N_Z)$) and min$(B,G,R)$ (or min$(N_X, N_Y,N_Z)$) which are the maximum and minimum values, respectively, of the image data signals B, G and R (or $N_X,N_Y,N_Z$). Preferably, the light component $f(B,G,R)$ (or $f(N_X,N_Y,N_Z)$) is set to either max$(B,G,R)$ or min$(B,G,R)$ or median$(B,G,R)$ (or median$(N_X,N_Y,N_Z)$), more preferably set to median$(B,G,R)$. Again, as in the second embodiment, the image data signals B, G and R which are to be color transformed in the first embodiment are preferably subjected to a setup operation so that they are transformed to image data signals having the color and density balances corrected in the appropriate way. As in the second embodiment, the setup operation may be performed by any of the various methods already described above or by any known methods.

As shown in FIG. 3, the thus obtained color transformed signals B', G' and R' (or $N'_X$, $N'_Y$ and $N'_Z$) are replicated as a reproduced image faithful to the original image such as the subject, the image on the original or the image displayed on a monitor, either immediately or after transformation to device-dependent data (DDD) signals. Consider, for example the case where the output device is a printer. If the obtained color transformed signals B', G' and R' (or $N'_X$, $N'_Y$ and $N'_Z$) already have printer-dependent optical densities B', G' and R', they are immediately input to the printer; if not, they are transformed to printer-dependent optical densities B', G' and R', which are then input to the printer. In either case, the printer replicates the printer-dependent optical densities B', G' and R' on the reflection medium to yield a reflection reproduced image (print) faithful to the original image. If the output device is a monitor, the obtained color transformed signals B', G' and R' (or $N'_X$, $N'_Y$ and $N'_Z$) are immediately input to the monitor if they are already monitor-dependent; if not, they are transformed to monitor-dependent signals (B',G',R'), which are then input to the monitor. In either case, the monitor displays a replication of the monitor-dependent signals to yield a monitor displayed reproduced image faithful to the original image.

The original image which is to be input to the image reproducing system to which the color transforming method according to the first embodiment of the invention is to be applied is in no way limited to subject, color transparency image, transparent negative image, reflection image, monitor displayed image and the image projected on a video projector which are described on the foregoing pages. It also goes without saying that the reproduced image which is to be an output image is by no means limited to the reflected image and the monitor displayed image which are described above and, alternatively, it may be a reproduced image either replicated on transparent media such as color transparency media (e.g. OHP paper and reversal film) or transparent negative media (e.g. negative film) or projected on a video projector or the like. Thus, in order to perform color space transformation such as by dynamic range transformation and color correction in accordance with the color transformation algorithm in the first embodiment, the image data signals for the input/output image defined by the input/output color space are not limited to any particular types and may be derived from any kinds of input/output image and input/output color space as long as they are image data represented by signals which consist of three mutually independent elements and which, when the values of said elements coincide, provide a color that is visually perceived as gray or if they can be converted to such image data. In addition, setting up or known image data processing for reproducing a preferred color may be performed either before or after executing the color transformation algorithm in accordance with the first embodiment of the invention.

Described above are the basic features of the compositions of the color transforming method according to the first embodiment of the invention and the image reproducing system to which this method is applied.

We now describe color transforming methods according to the third and fourth embodiments of the invention. The most characteristic feature common to the color transforming methods according to these embodiments is that color transformations such as dynamic range transformation and color correction are performed using the integral equivalent neutral densities (integral END or IND) defined in the already described second embodiment.

In the third embodiment, a color image formed on a first medium (input medium) such as a color transparency medium, a transparent negative medium, a reflection medium, a display medium in a monitor or a projection medium in a video projector is replicated on a second medium (output medium) such as a reflection medium, a display medium in a monitor, a projection medium in a video projector or a transparent medium; to perform the replication, the first and second media are managed by END densities integrated by at least three independent spectral sensitivities (in other words, the color image data on the first and second media are dealt with as integral END data for each pixel) and the integral END densities are used to perform the necessary processes such as color gamut transformation (e.g. dynamic range transformation) and color correction.

Similarly, in the fourth embodiment, a subject is replicated on the various media mentioned above, except that it is imaged with a digital camera, a video camera or the like to be directly transformed to exposure densities at three or more independent spectral sensitivities or, alternatively, the subject is first photographed on a transparent medium such as a negative or positive film and then transformed to exposure densities at three or more independent spectral sensitivities by means of a scanner or a solid-state imaging device; in addition, the output medium is managed with END densities integrated by those exposure densities at three or more independent spectral sensitivities (namely, the color image data on the subject and the output medium are dealt with as integrated END data per pixel) and the integrated END densities are used to perform the necessary processes such as color gamut transformation (e.g. dynamic range transformation) and color correction.

It should be noted that the exposure densities and integral equivalent neutral densities to be used in the third and fourth embodiments of the invention are not limited to the above-described image data which are expressed on a logarithmic scale and they may be image data expressed on a power scale (provided that the exponent $\gamma$ satisfies $0<\gamma<1$).

The color gamut transformation, color correction and other processes that are performed in the third and fourth embodiments are by no means limited to the methods for accomplishing faithful reproduction of the original image by the color transformation algorithm for the color transforming method according to the first and second embodiments of the invention and any known methods of color gamut transformation, color correction and color space transformation may be substituted. For example, the combination of tone (or contrast) changes and matrix operations, or color gamut transformation by three-dimensional transformation or color correction such as the adjustment of hue or chroma or the reproduction of a preferred color may be substituted.

According to the above-described first to fourth embodiments of the invention, the color image formed on a subject or a first image forming medium is replicated on a second image forming medium with the input image data being transformed to equivalent neutral densities or expansions thereof to integral equivalent neutral densities, followed by the performance of appropriate lightness compression or extension at a specified ratio, so as to output a reproduced image faithful to the input image.

However, when the present inventor performed a visual evaluation of the resulting reproduced image, it was found that the face should be made even lighter whereas the blue sky should be finished "deeper" through addition of a density.

Based on this finding, the present inventors conducted intensive studies on the technique of selectively controlling the lightnesses of skin and sky colors. As a result, they found that the difference between each of input signals R, G and B and its median value A (i.e., R–A, G–A and B–A) and the values these functions such as R–B{=(R–A)–(B–A)}, R–G, G–B take on the ring of hues correlated to the results of the visual evaluation mentioned above and that by performing gamma increasing and compressing or extending the lightness component, both proper color reproduction and the selective reproduction of the important colors in a visually preferred lightness level could be accomplished simultaneously.

The color transforming method according to the fifth embodiment of the invention will now be described in detail.

Figure 5:
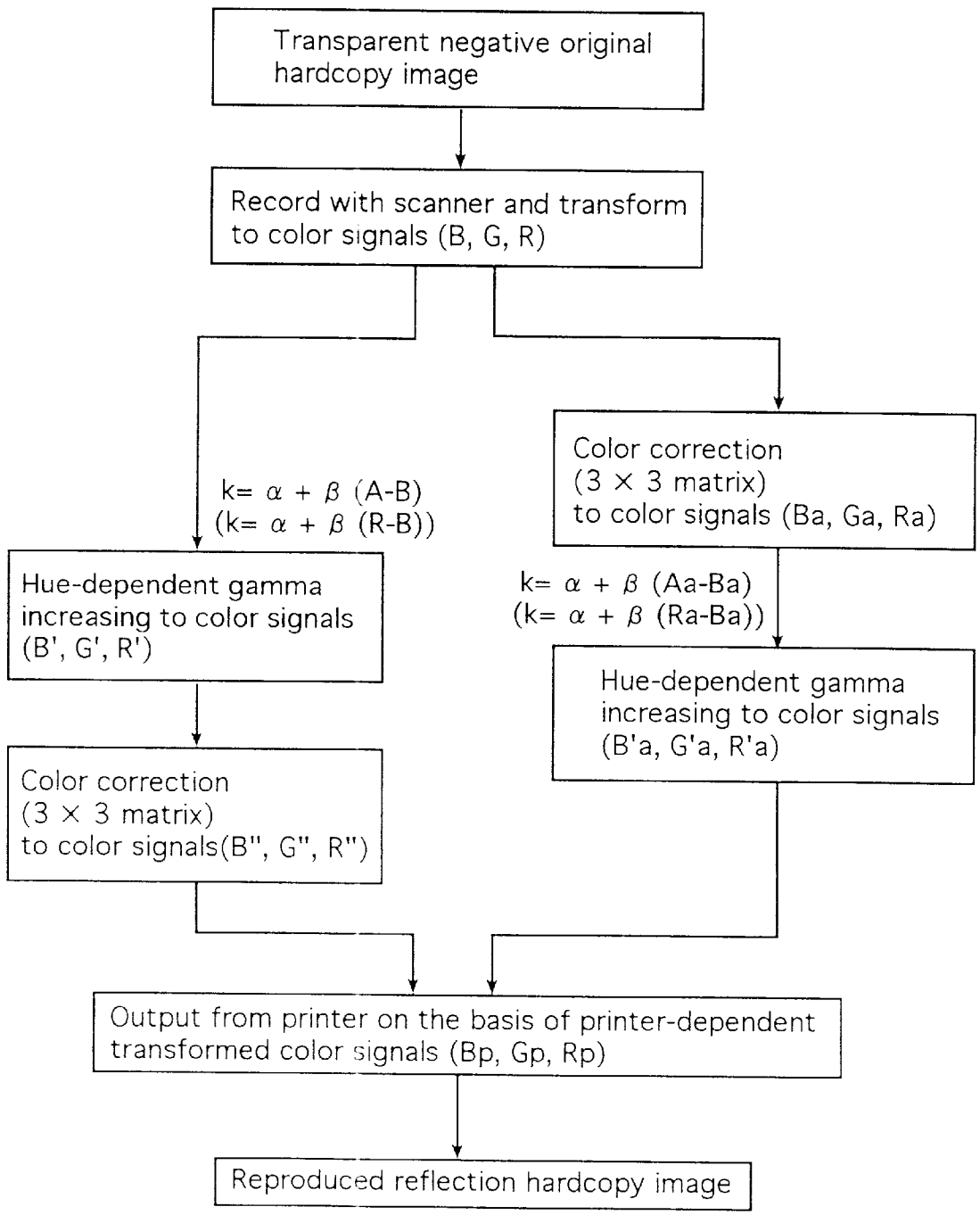
FIG. 5 is a flowchart illustrating a color transforming method according to still another embodiment of the invention.

FIG. 5 illustrates how color transformation is performed in accordance with the fifth embodiment of the invention. As shown, the process starts with recording an image on a transparent negative original such as a color negative film with a scanner so that it is input as color signals (B,G,R) for each pixel.

The color signals (B,G,R) taken per pixel from the image on the transparent negative original by recording with the scanner are typically digital image data (optical densities) on the three colors R, G and B which have been obtained by photoelectric conversion with a solid-state imaging device such as CCD in the scanner and subsequent A/D conversion. Alternatively, the color signals (B,G,R) may be exposure densities transformed from the digital image data with the intermediary of the characteristic curve (spectral sensitivities) of the transparent negative image forming medium such as a color negative film.

In the first case of color transformation according to the fifth embodiment of the invention, the process goes to the flow on the left side of FIG. 5 and the scanner-recorded color signals (B,G,R) are subjected, per pixel, to the hue-dependent gamma increasing step which is the characterizing part of the invention and which is expressed by the following equation (26), more strictly the following equation (13), whereby gradation hardened color signals (B',G', R') are produced:

$$\begin{bmatrix} B' \\ G' \\ R' \end{bmatrix} = k \begin{bmatrix} B \\ G \\ R \end{bmatrix} = \{\alpha + \beta(A-B)\} \begin{bmatrix} B \\ G \\ R \end{bmatrix} \quad (26)$$

$$\begin{pmatrix} B' \\ G' \\ R' \end{pmatrix} = k \begin{pmatrix} B - C_1 \\ G - C_1 \\ R - C_1 \end{pmatrix} + \begin{pmatrix} C_2 \\ C_2 \\ C_2 \end{pmatrix} \quad (13)$$

where the transforming coefficient k is a gamma increasing coefficient and $C_1$ and $C_2$ are positive real numbers specified by the color transforming system or the image to be subjected to color transformation.

The equation (13) is a combination of the equation (26) with $C_1$ and $C_2$ which represents the real system more correctly. $C_1$ and $C_2$ are for example stain densities of the input and output media, respectively, and form the setup condition. In the following description of the embodiment, the equation (26) which does not include $C_1$ and $C_2$ is used for the sake of simplicity.

The gamma increasing coefficient k is a function of the color signals (B,G,R) for each pixel. The coefficient takes a relatively small value when the color signals (B,G,R) for each pixel take values satisfying B>G>R, or the hue corresponding thereto is yellow red, and takes a relatively large value when the color signals (B,G,R) for each pixel take values satisfying B<G<R, or the hue corresponding thereto is cyan blue.

Thus, the gamma increasing coefficient k which is a transforming coefficient, is preferably a function which includes at least one of the differences between color signal components $\Delta S$ (hereinafter referred to as the differences between color components): (R–A), (A–B), (R–G), (R–B) and (G–B). The function is more preferably a linear function.

The symbol A is preferably a function of the color signals for each signal which satisfies the following equation (11) or (12):

$$\min(B,G,R) \leq A \leq \max(B,G,R) \tag{11}$$

$$\min(B,R) < A < \max(B,R) \tag{12}$$

Especially, the symbol A represents preferably the median of the color signals (B,G,R) for each pixel. If the median is defined as a function representing the second largest value for a given set of (B,G,R), A can be expressed by the following equation (27):

$$A = \mathrm{median}\{B,G,R\} \tag{27}$$

When the gamma increasing coefficient k is the linear function of one of (R−A), (A−B), (R−G), (R−B) and (G−B), the coefficient can be expressed by the following equation (28):

$$k = \alpha + \beta \cdot \Delta S \tag{28}$$

where α and β are constants and ΔS represents any one of (R−A), (A−B), (R−G), (R−B) and (G−B) which are differences between color components. By the use of differences between color components ΔS exemplified by (A−B) and (R−B), the equation (28) is expressed as follows:

$$k = \alpha + \beta(A-B) \tag{28-1}$$

$$k = \alpha + \beta(R-B) \tag{28-2}$$

By adjusting the gamma increasing coefficient k to selectively depend on the difference between color components (R−A), (A−B), (R−G), (R−B) or (G−B) which can be made to correspond to the hue, the important colors such as skin color (yellow red) and blue sky (cyan blue) can be finished in a visually preferred lightness level, namely, the skin color is reproduced lighter and the blue sky deeper. This aspect of the invention will now be described in greater detail.

The present inventor conducted intensive studies on the visually preferred lightness reproduction of the important colors including the skin and sky colors. As a result, they found that if a given set of signals (B,G,R) result from a subtractive color mixing system (as expressed by optical density) and if A is the median of (B,G,R), the relationships set forth in Table 2 will hold (if the given set of signals (B,G,R) are those resulting from an additive mixture system such as density signal of the color negative film and monitor signal, the signs are reversed).

TABLE 2

Values Taken by Various Functions on Hue Ring

| Coefficients | B | ~ | C | ~ | G | ~ | Y | ~ | R | ~ | M | ~ |
|---|---|---|---|---|---|---|---|---|---|---|---|---|
| R−A | 0 | + | + | + | 0 | 0 | 0 | − | − | − | 0 | 0 |
| A−B | + | + | 0 | 0 | 0 | − | − | − | 0 | 0 | 0 | + |
| R−G | 0 | + | + | + | + | + | 0 | − | − | − | − | − |
| R−B | + | + | + | + | 0 | − | − | − | − | − | 0 | + |
| G−B | + | + | 0 | − | − | − | − | − | 0 | + | + | + |

As is clear from Table 2, the difference between color signals A−B takes a minimum value (negative) when the hue is yellow and takes a maximum value (positive) when the hue is blue. Similarly, the difference between color components R−A takes a maximum value (positive) when the hue is cyan and takes a minimum value (negative) when the hue is red. Therefore, the sum of the two functions (R−A)−(B−A)=R−B takes a minimum value (negative) when the hue is yellow red and takes a maximum value (positive) when the hue is cyan blue. As seen from Table 2, the same is applied not only to (A−B) and (R−B), but also to (R−A), (R−G) and (G−B), in the sense that yellow red (skin color) is reproduced relatively lighter and cyan blue (blue sky) relatively deeper. Thus, considering these features, gamma increasing is performed with the coefficient k being adjusted to depend on a difference between color components ΔS corresponding to the hue (hereinafter expressed simply as the hue) such as (A−B), (R−B) or the like as in the equation (28) and the appropriate color correction (to be described below) is subsequently performed to have the important colors finished in a visually preferred lightness level, i.e., the skin color is rendered "relatively light" and the blue sky color "relatively deep".

For the sake of simplicity, the description below is directed to a typical example in which the gamma increasing coefficient k (a transforming coefficient) is a linear function of the hue (A−B) or (R−B), and A represents the median (A=median {R,G,B}) of the color signals (R,G,B) for each pixel, but the invention is in no way limited to this example.

In the present discussion, α is expressed as the ratio between the contrast of the reflection print (reproduced reflection image) and the contrast of the subject and typically takes a value of 1.8. If a reflection print is to be prepared from the density data of a color negative film, the value of 2.5 (≅1.8/0.7) is recommended considering the fact that the characteristic curve of the color negative film has a gamma (γ) of 0.7). However, this is not the sole case of the invention and α may be set at any appropriate value depending upon the input medium/input device/input color signals and the output medium/output device/output color signals. β is the parameter for controlling the degree of gamma increasing in accordance with the hue.

The color signals (B',G',R') obtained by the hue-dependent gamma increasing is thereafter subjected to color correction using, for example, a 3×3 matrix as expressed by the following equation (29), thereby yielding color signals (B",G",R") per pixel which have been subjected to color transformation in accordance with the invention. The transformed color signals (B",G",R") are output per pixel to the printer.

$$\begin{bmatrix} B'' \\ G'' \\ R'' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} B' \\ G' \\ R' \end{bmatrix} = (AA) \begin{bmatrix} B'' \\ G'' \\ R'' \end{bmatrix} \tag{29}$$

where $$(AA) = \begin{bmatrix} a_{11} & a_{12} & a_{13} \\ a_{21} & a_{22} & a_{23} \\ a_{31} & a_{32} & a_{33} \end{bmatrix}$$

In the equation (29), (AA)={$a_{ij}$, ij=1−3} represents a 3×3 color correcting matrix which is used to perform color transformation from the color space of the input system to the color space of the output system (in the illustrated case, the color transformation is from the color space of the image on a transparent negative original to the printer-dependent color space). The color correcting matrix (AA) is by no means limited to the above-mentioned 3×3 matrix and color correcting matrices containing higher-order terms such as 3×4, 3×9 and 3×10 matrices may be substituted.

In the illustrated case, the color correcting matrix is used in the color correction process but this is not the sole case of the invention and the matrix may be replaced by a lookup table (hereunder abbreviated as "LUT"), such as a three-dimensional LUT (3D-LUT). Further, in the illustrated case, the primary colors of the output color space are R, G and B but this is not the sole case of the invention and other sets of primary colors may be employed, as exemplified by cyan (C), magenta (M) and yellow (Y), or black (K) may be added to produce four colors as in printing.

The printer is thusly supplied with the color corrected color signals (B",G",R"), which are then transformed to color signals inherent in the printer, namely, at least three primary colors ($B_P,G_P,R_P$) for the output reflection medium inherent in the printer and on the basis of these color signals ($B_P,G_P,R_P$), a reflection print is output which has a reflection image reproduced on an output reflection medium such as a color paper. In the illustrated case, the color corrected color signals (B",G",R") are fed to the printer so that they are further transformed to printer-dependent color signals ($B_P$, $G_P,R_P$); however, this is not the sole case of the invention and the color correction process may accomplish direct transformation to the printer-dependent color signals ($B_P$, $G_P,R_P$).

The thus obtained output reflection image is characterized by the reproduction of the skin and blue sky colors in a visually preferred lightness level, with the skin color finished lighter and the blue sky deeper.

There is the second case of color transformation which is performed in accordance with the fifth embodiment of the invention and this is shown in the flow on the right side of FIG. 5. In this second case, the order of gamma increasing and color correction steps is reversed and the color correction is effected first and, thereafter, the hue-dependent gamma increasing which is the characterizing portion of the invention is performed. Since the only difference between the first and second cases concerns the order of color correction and gamma increasing steps, their details need not be given here and the following description will suffice.

Briefly, the second case of color transformation according to the fifth embodiment of the invention starts with performing color correction on the scanner-recorded color signals (B,G,R) as by a 3×3 color correcting matrix (AA) so that they are transformed to color corrected color signals ($B_a$, $G_a,R_a$) [see the following equation (30)].

$$\begin{bmatrix} B_a \\ G_a \\ R_a \end{bmatrix} = (AA)\begin{bmatrix} B \\ G \\ R \end{bmatrix} = \begin{bmatrix} a_{11} & a_{12} & a_{13} \\ a_{21} & a_{22} & a_{23} \\ a_{31} & a_{32} & a_{33} \end{bmatrix}\begin{bmatrix} B \\ G \\ R \end{bmatrix} \quad (30)$$

Thereafter, as expressed by the following equation (31) or (32), the transformed color signals ($B_a,G_a,R_a$) are subjected to the hue-dependent gamma increasing process which is the characterizing portion of the invention using a coefficient k which is expressed by either the following equation (33) or (34), so as to transform those signals to ($B_a',G_a',R_a'$) and these color transformed signals are output to the printer:

$$\begin{bmatrix} B_a' \\ G_a' \\ R_a' \end{bmatrix} = k\begin{bmatrix} B_a \\ G_a \\ R_a \end{bmatrix} = \{\alpha + \beta(A_a - B_a)\}\begin{bmatrix} B_a \\ G_a \\ R_a \end{bmatrix} \quad (31)$$

$$\begin{bmatrix} B_a' \\ G_a' \\ R_a' \end{bmatrix} = k\begin{bmatrix} B_a \\ G_a \\ R_a \end{bmatrix} = \{\alpha + \beta(R_a - B_a)\}\begin{bmatrix} B_a \\ G_a \\ R_a \end{bmatrix} \quad (32)$$

where $$k = \alpha + \beta(A_a - B_a) \quad (33)$$

$$k = \alpha + \beta(R_a - B_a) \quad (34)$$

$$A_a = \text{median}\{B_a, G_a, R_a\}$$

As in the first case, the color transformed signals ($B_a'$, $G_a',R_a'$) are transformed to printer-dependent signals ($B_p$, $G_p,R_p$), or signals inherent in the printer, and on the basis of these signals ($B_p,G_p,R_p$), a reproduced reflection image is output as a reflection print. In the illustrated case, the color signals ($B_a',G_a',R_a'$) from the color transformation performed in accordance with the present invention are further transformed to the printer-dependent color signals ($B_p,G_p$, $R_p$) in the printer; however, this is not the sole case of the invention and the color correction and gamma increasing processes may be so adapted that the hue-dependent gradation hardened color signals ($B_a',G_a',R_a'$) which are characteristic of the invention are produced direct as the printer-dependent color signals ($B_P,G_P,R_P$).

As in the first case, the reproduced reflection image thus obtained is characterized in that the important colors such as the skin and blue colors are reproduced in the preferred way.

In the two cases described above, explanation is facilitated by assuming that the gamma increasing and the color correction are performed separately on the basis of different mathematical expressions; however, this is not the sole case of the invention and the two processes, with the order of their performance being predetermined, may be integrated into one routine which can be executed on the basis of a single mathematical expression. For example, in the first case, the equation (28-1) or (28-2) may be substituted into the equation (26), which is then substituted into the equation (29) to reformulate the following equation (35) or (36); in the second case, the equation (30) may be substituted into the equation (31) or (32) to reformulate the following equation (37) or (38). Mathematical operations for the gamma increasing and color correction may be performed using those equations (35)–(38):

$$\begin{bmatrix} B'' \\ G'' \\ R'' \end{bmatrix} = (\alpha + \beta(A - B))\begin{bmatrix} a_{11} & a_{12} & a_{13} \\ a_{21} & a_{22} & a_{23} \\ a_{31} & a_{32} & a_{33} \end{bmatrix}\begin{bmatrix} B \\ G \\ R \end{bmatrix} \quad (35)$$

$$\begin{bmatrix} B'' \\ G'' \\ R'' \end{bmatrix} = (\alpha + \beta(R - B))\begin{bmatrix} a_{11} & a_{12} & a_{13} \\ a_{21} & a_{22} & a_{23} \\ a_{31} & a_{32} & a_{33} \end{bmatrix}\begin{bmatrix} B \\ G \\ R \end{bmatrix} \quad (36)$$

$$\begin{bmatrix} B_a' \\ G_a' \\ R_a' \end{bmatrix} = \{\alpha + \beta(A_a - B_a)\}\begin{bmatrix} a_{11} & a_{12} & a_{13} \\ a_{21} & a_{22} & a_{23} \\ a_{31} & a_{32} & a_{33} \end{bmatrix}\begin{bmatrix} B \\ G \\ R \end{bmatrix} \quad (37)$$

$$\begin{bmatrix} B_a' \\ G_a' \\ R_a' \end{bmatrix} = \{\alpha + \beta(R_a - B_a)\}\begin{bmatrix} a_{11} & a_{12} & a_{13} \\ a_{21} & a_{22} & a_{23} \\ a_{31} & a_{32} & a_{33} \end{bmatrix}\begin{bmatrix} B \\ G \\ R \end{bmatrix} \quad (38)$$

where $B_a = a_{11}B + a_{12}G + a_{13}R$ $G_a = a_{21}B + a_{22}G + a_{23}R$ $R_a = a_{31}B + a_{32}G + a_{33}R$ $A_a = \text{median}(B_a, G_a, R_a)$.

In the above-described cases, the gamma increasing process is a linear operation and provides the same result. However, the gamma increasing process to be performed in the present invention is not theoretically limited to a linear operation and as long as the hue-dependent gamma increasing is performed in accordance with the invention, a nonlinear gamma increasing process may be included prior to or after said hue-dependent gamma increasing process. In a typical example, before or after a nonlinear default gamma increasing process is performed, the hue-dependent gamma increasing which is characteristic of the invention may be performed in accordance with the following equation (39): This method enables a nonlinear and selective gamma increasing process to be realized in the invention.

$$\begin{bmatrix} B' \\ G' \\ R' \end{bmatrix} = [1.0 + \beta(A-B)] \begin{bmatrix} B \\ G \\ R \end{bmatrix} \text{ or}$$

$$\begin{bmatrix} B' \\ G' \\ R' \end{bmatrix} = [1.0 + \beta(R-B)] \begin{bmatrix} B \\ G \\ R \end{bmatrix}$$

(39)

In the above-described cases, the color signals for the color space of the input system are those taken from the image on a transparent negative original by means of a scanner. However, this is not the sole case of the invention and the color signals may be replaced by those taken from the image on a color transparency original or a reflection original by means of a scanner or those for displaying an image on the viewing screen of a monitor. Thus, the color signals to be processed by the method of the invention may be such that their individual elements, say, (B,G,R) coincide in value and that the value of coincidence is given by a linear function of the logarithm or power number of the luminance L of the corresponding gray or, alternatively, they may be color signals on a logarithmic scale such as optical density, exposure density, logarithmic exposure, calorimetric density, an equivalent neutral density and integral equivalent neutral density or they may be color signals on a power scale, as exemplified by TV monitor signals (exponent, $\gamma=1/2.2$) and calorimetric values (exponent, $\gamma=1/3$). It should be noted that these color signals are preferably already set up as the result of adjustment in lightness and/or white balance.

In the first and second cases of the fifth embodiment of the invention, the gamma increasing step of the color transformation process is performed in a hue-dependent manner such that the desired color reproduction is accomplished with appropriate adjustment of the lightness of the important colors in the original image, in particular, the skin and blue sky colors. Specifically, the skin color is finished lighter than what is actually is and the blue sky deeper. This is not the sole case of the invention and the lightness of each color may be directly adjusted to an optimal value in accordance with its hue, as in the color transforming method in the third case of the fifth embodiment of the invention.

As already mentioned, the first and second embodiments of the invention are such that the data of the original image are transformed to equivalent neutral densities (END) or integrated extensions thereof, i.e., integral equivalent neutral densities (integral END) and the like, and their lightness component is subjected to appropriate compression or extension at a specified ratio, thereby yielding a reproduced image having high fidelity to the input image. Thus, the third case of the fifth embodiment of the invention is a modification of the second embodiment, in which the lightness component is compressed or extended in a hue-dependent manner so as to ensure that the important colors, in particular, the skin and blue sky colors are reproduced in a preferred way.

Figure 6:
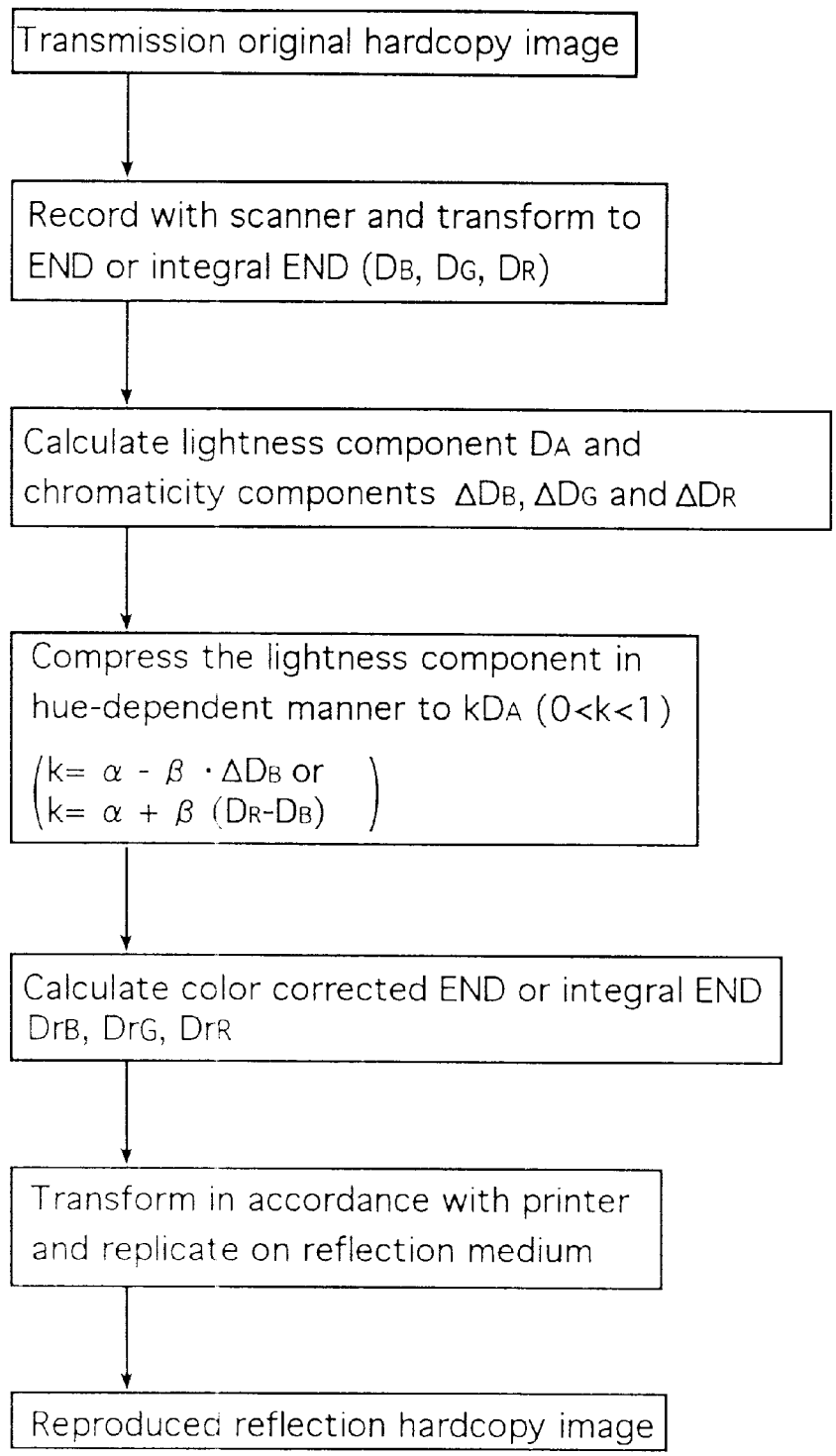
FIG. 6 is a flowchart illustrating a color transforming method according to another embodiment of the invention.

FIG. 6 is a flowchart illustrating the color transforming method according to the third case of the fifth embodiment of the invention. The algorithm of the flow shown in FIG. 6 is identical to the algorithm of the flow in the second embodiment shown in FIGS. 1 and 2 except for the step of compressing the lightness component and, hence, identical steps will not be described in detail.

As shown, the color transforming method according to the third case of the fifth embodiment of the invention comprises photoelectric scanner reading of a color image photographed on a transmission original, recording the image as original image color signals per pixel, and transforming them to signals the three values of which coincide for a plurality of colors visually perceived as gray for each pixel and which are on a logarithmic scale with respect to the intensity of light, as exemplified by equivalent neutral densities (END) or integral equivalent neutral densities (integrated END or IND). In the following description, the transformed signals are written as $D_B$, $D_G$, $D_R$ and assumed to be IND as a representative case.

In the next step, the lightness component $D_A$ and the chromaticity components of the respective colors $\Delta D_B$, $\Delta D_G$ and $\Delta D_R$ are calculated in accordance with the following equations (40) and (41):

$$D_A = \text{median}\{D_B, D_G, D_R\}$$ (40)

$$\begin{bmatrix} \Delta D_B \\ \Delta D_G \\ \Delta D_R \end{bmatrix} = \begin{bmatrix} D_B - D_A \\ D_G - D_A \\ D_R - D_A \end{bmatrix}$$ (41)

As is clear from the equation (40), the lightness component $D_A$ is preferably set at the median of the densities (IND) $D_B$, $D_G$, $D_R$, but may be set at any value between the maximum value and the minimum value. The lightness component $D_A$ is set at the median to provide a definition that makes the appearance of a specific color compatible with its lightness.

The next step is compression of the lightness component in a hue-dependent manner which is the most characteristic portion of the third case, in which color corrected IND $(D_{rB}, D_{rG}, D_{rR})$ are calculated in accordance with the following equation (42) or (43):

$$\begin{bmatrix} D_{rB} \\ D_{rG} \\ D_{rR} \end{bmatrix} = \begin{bmatrix} D_B - D_A \\ D_G - D_A \\ D_R - D_A \end{bmatrix} + k \begin{bmatrix} D_A \\ D_A \\ D_A \end{bmatrix}$$ (42)

$$= \begin{bmatrix} D_B - D_A \\ D_G - D_A \\ D_R - D_A \end{bmatrix} + k \begin{bmatrix} D_A - \min_{(xy)} D_A \\ D_A - \min_{(xy)} D_A \\ D_A - \min_{(xy)} D_A \end{bmatrix} + \begin{bmatrix} D_{rW} \\ D_{rW} \\ D_{rW} \end{bmatrix}$$ (43)

where k is a lightness compression coefficient which satisfies $0<k<1$. In the third case of the fifth embodiment of the invention, the lightness compression coefficient k is defined by the following equation (44) or (45) such that it depends on chromaticity components such as $(D_B-D_A)$ and $(D_R-D_A)$:

$$k = \alpha - \beta(D_B - D_A) = \alpha + \beta(D_A - D_B)$$ (44)

$$k = \alpha + \beta\{(D_R - D_A) - (D_B - D_A)\} = \alpha + \beta(D_R - D_B)$$ (45)

where $\alpha$ and $\beta$ are constants.

By thusly ensuring that the lightness compression coefficient k depends on the chromaticity components $(D_B-D_A)$ and $(D_R-D_B)$ $\{=(D_R-D_A)-(D_B-D_A)\}$, the lightness of the important colors, in particular, the skin and blue sky colors can be compressed to a preferred extent that is sufficiently dependent on their hues to reproduce them as preferred colors. Stated more specifically, the skin color as such the color of the face and the blue sky color are elicited from the hue information and the lightness compression coefficient k for those colors is selectively controlled such that the skin color such as the color of the face is compressed by the greater degree to be finished lighter whereas the blue sky color is compressed by the smaller degree to be finished deeper and thicker. In this way, lightness compression is achieved in a hue-dependent manner.

The above equation (43) takes into account the setup condition which requires the brightness point in the image on the original, which is a reversal original in the case under discussion, to coincide with the white background $D_{rW}$ of the paper which is a reflection medium and $\min_{(xy)} D_A$ in the equation (43) represents the minimal value of $D_A$ for all pixels in the entire image forming area.

When the color corrected integrated END densities ($D_{rB}$, $D_{rG}$, $D_{rR}$) have been thusly computed as signals in which only the lightness component ($D_A - \min_{(xy)} D_A$) is compressed in a hue-dependent manner, the density signals ($D_{rB}$, $D_{rG}$, $D_{rR}$) are converted to output image signals (device dependent data) which are dependent on the printer (i.e., the reflection medium used with the printer) and on the at least three colorants formed on the reflection medium, and the printer then yields a reproduced reflection image as a replication of the image from the transmission original onto the reflection medium. The reproduced image thus replicated on the reflection medium features proper or faithful reproduction of the image from the transmission original, in which the hues are preserved adequately or sufficiently, the highlights and shadows are fully described and only the lightness component has been compressed in a hue-dependent manner and the important colors, in particular the skin color and the blue color have been reproduced in a visually preferred lightness level.

In the invention, the description of highlights and shadows and the reproduction of the important colors in a visually preferred lightness level are performed positively. Hues are not completely preserved in some cases, but are visually appropriate. The chroma is not preserved correctly but tends to become somewhat higher than what it should be. Since the slight increase in chroma is generally preferred from the viewpoint of visual perception, the equation (42) should suffice for performing the intended color transformation. However, if there is the need for chroma adjustment, the equation (43) is preferably replaced by the following equation (46) using not only the hue-dependent lightness compression coefficient $k_1$ which is the most characterizing aspect of the invention but also a parameter $k_0$ which satisfies $0 < k_1 < k_0 \leq 1$:

$$D_{ri} = k_0(D_i - D_A) + k_1(D_A - \min_{(xy)} D_A) + D_{rW}$$

$$D_{ri}(x,y) = k_0\{D_i(x,y) - D_A(x,y)\} + k_1\{D_A(x,y) - \min_{(xy)} D_A(x,y)\} + D_{rW} \quad (46)$$

where parameter $k_1$ is the hue-dependent lightness compression coefficient which has the same meaning as compression coefficient k defined by the equation (44) or (45).

As to the hue-dependent lightness compression coefficient $k_1$ (or k), the constants $\alpha$ and $\beta$ in the above equation (44) or (45) may be set at appropriate values that satisfy $0 < k_1(k) < 1.0$ in accordance with the dynamic density range of the input image on the original (e.g. a color positive image on a reversal film) or the subject, as well the dynamic range of the densities that can be reproduced on the output reflection print. Considering the dynamic density range ratio for the case where the image on a reversal original is output as a reflection print, human vision and other factors, the lightness compression coefficient $k_1$ (or k) is preferably set at a value within the range that satisfies $0.7 < k_1$ (or k) $< 1.0$ in a hue-dependent manner. More preferably, the coefficient $k_1$ (or k) is within a range that satisfies $0.75 \leq k_1$ (or k) $\leq 0.9$. Therefore, the constant $\alpha$ of the above equations (44) and (45) is in the range which satisfies $0 < \alpha < 1.0$, preferably $0.7 < \alpha < 1.0$, more preferably $0.75 \leq \alpha \leq 0.9$. Speaking of parameter $k_0$ (also called chroma coefficient), it is not limited to any particular value and may appropriately be set in accordance with the increase in the chroma of the reflection print to be reproduced or it may be set at visually the best value; in a typical case, the parameter $k_0$ is preferably equal to or greater than the lightness compression coefficient $k_1$, satisfying $k_1 \leq k_0 \leq 1.0$. It should also be noted that the parameter $k_0$ is in no way limited to the constant and may be varied in accordance with (B,G,R) as in the hue-dependent lightness compression coefficient $k_1$, so that nonlinear transformation may be performed as in the case of S-shaped curve which is employed for silver halide photographic materials.

It should be noted that the lookup tables (see the above equations (6), (7), (8) and (10)) and setup operation (see the equation (9) above) as used in the second embodiment of the invention can of course be applied to the present case. Therefore, it is needless to say that the important colors can be reproduced in a visually preferred lightness level in the present case, since the lightness compression coefficient $k_1$ of the following equation for color transformation (5) in the second embodiment of the invention is made dependent upon the hue by the equation (47) or (48) below.

$$B3 = k_0(B2-A) + k_1(A - \min_{(xy)} A) + BW$$

$$G3 = k_0(G2-A) + k_1(A - \min_{(xy)} A) + GW$$

$$R3 = k_0(R2-A) + k_1(A - \min_{(xy)} A) + RW \quad (5)$$

$$k_1 = \alpha + \beta(A - B2) \quad (47)$$

$$k_1 = \alpha + \beta(R2 - B2) \quad (48)$$

where $\alpha$ and $\beta$ are constants.

A is a function which determines the lightness component as the median of the integral END (or END) (B2, G2, R2) and which satisfies A=median {B2,G2,R2}.

Described above are the basic features of the color transforming method according to the third case of the fifth embodiment of the invention. We now describe a color transforming method according to the fourth case of the fifth embodiment of the invention.

The color transformation algorithm according to the third case can be also extended in the fourth case of this embodiment, in the same way that the color transformation algorithm in the color transformation processing of the second embodiment was extended in the first embodiment of the invention. That is, the present case also enables the extension of the color transformation algorithm from image data signals such as END and integral END which are on a logarithmic scale to image data signals such as TV monitor signals which are on a power scale, and from the one for compressing a color space to one for compressing and extending the color space.

Thus, in the color transforming method according to the fourth case of the fifth embodiment, the digital image data signals to be processed by an expanded color transformation algorithm may be similarly defined as image data represented by signals that consist of three mutually independent elements and which, when the values of said elements coincide, provide a color that is visually perceived as gray.

Figure 7:
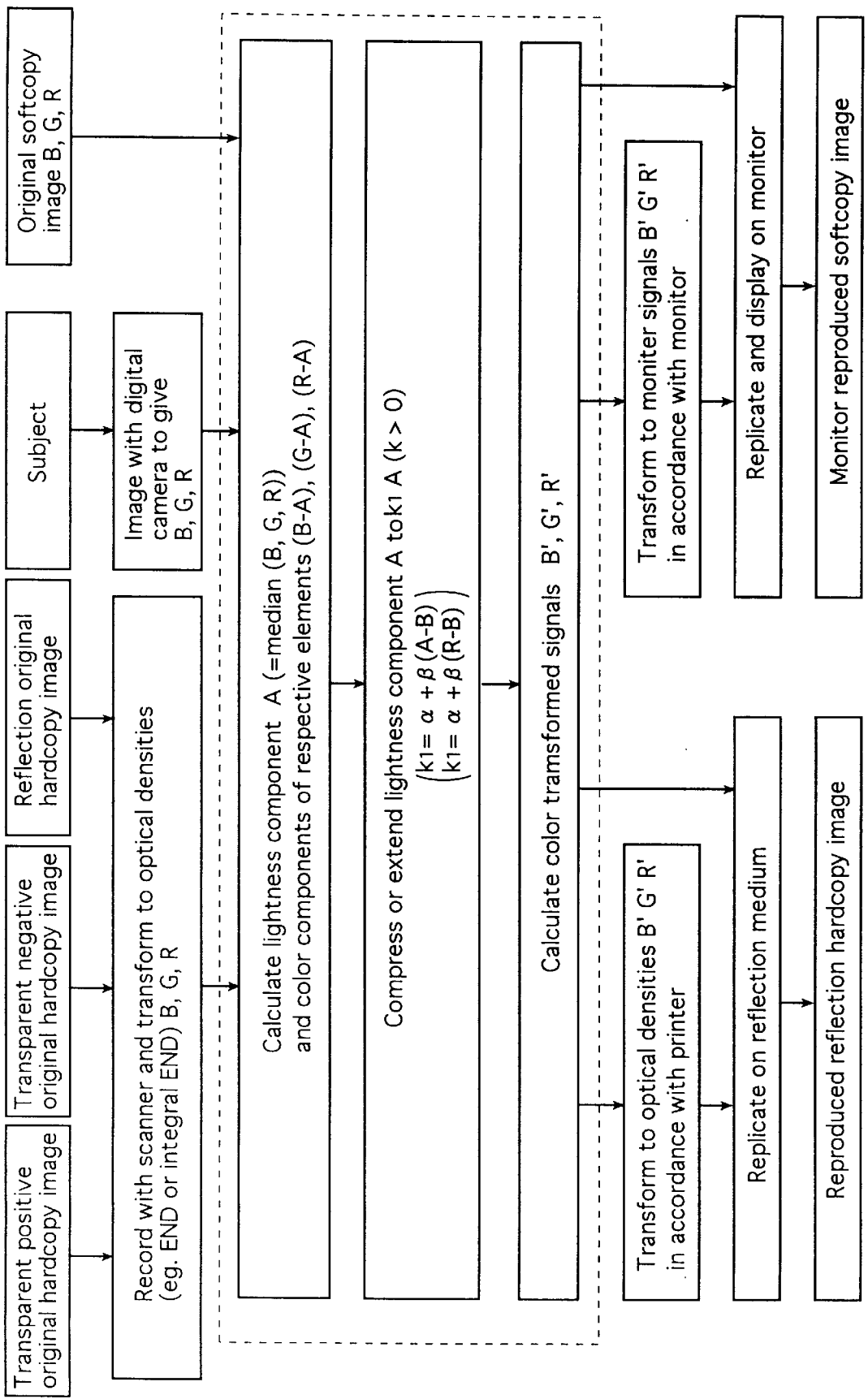
FIG. 7 is a flowchart illustrating yet another embodiment of the invention.
Figure 9A:
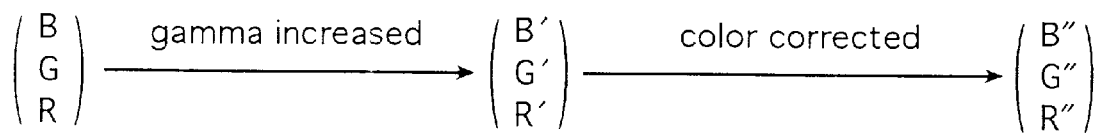
FIGS. 9a and 9b illustrate two conventional schemes for performing color transformation.
Figure 9B:
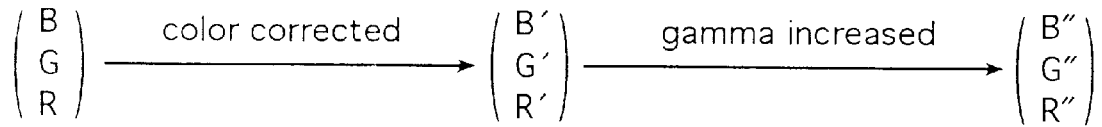

The thus defined image data are processed with the image reproducing system shown in FIG. 7 which includes a flow of the expanded color transformation algorithm for the color transforming method according to the fourth case of the fifth embodiment. The image reproducing system shown in FIG. 7 is the same as the image reproducing system shown in FIG. 3, except that the former does not include a system for transforming the image signals of the subject photographed with a digital camera and the image signals on the monitor (B,G,R) to the colorimetric values ($N_x$, $N_y$, $N_z$), the lightness component f(B,G,R) of the block delineated by a dashed line in the color transformation algorithm according to the first embodiment is the median A (=median(B,G,R)), and that the compression or extension ratio $k_1$ of the lightness component A varies with the hue. The block delineated by a dashed line in FIG. 7 shows the color transformation algorithm which comprises a flow of the color transforming method according to the fourth case of the fifth embodiment. Except that the lightness component is both compressed and extended in a hue-dependent manner, this is identical to the third to fifth steps in the color transformation algorithm which comprises a flow of the color transforming method according to the third case as shown in FIG. 6; hence, the individual steps in the expanded input and output systems and the expanded color transformation algorithm will not be described here.

Thus, when the image data signals B, G and R to be processed by the color transforming method according to the fourth case of the fifth embodiment of the invention are obtained in the same way as in the first embodiment, the color transformation algorithm delineated by the dashed line in FIG. 7 is executed.

First, the lightness component A=median{B,G,R} defined as the median of the three-element image data signals B, G and R is determined. Subsequently, the lightness component A is subtracted from each of the three-element image data signals B, G and R to calculate the chromaticity components of the respective elements, i.e., (B–A), (G–A) and (R–A).

In the next step, depending upon the three image data signals B, G and R, the lightness component A is extended or compressed (namely, amplified or attenuated) to perform dynamic range transformation ($k_1$A) at a specified hue-dependent transformation ratio $k_1$ ($k_1$>0) expressed by the equation (49) or (50) below. The ratio of hue-dependent dynamic range transformation $k_1$ ($k_1$>0) is determined in accordance with the three image data signals B, G and R. If 0<$k_1$<1, the dynamic range (hence, the color space) is compressed (the lightness component is attenuated); on the other hand, if $k_1$>1, the dynamic range is extended (the lightness component is amplified).

$$k_1 = \alpha + \beta(A-B) \quad (49)$$

$$k_1 = \alpha + \beta(R-B) \quad (50)$$

where $\alpha$ and $\beta$ are constants.

Subsequently, depending upon the three-element image data signals B, G and R, the chromaticity components B–A, G–A and R–A of the three elements are amplified or attenuated at respective specified ratios $k_{01}$, $k_{02}$ and $k_{03}$ ($k_{01}$, $k_{02}$, $k_{03}$>0). This yields color corrected chromaticity components $k_{01}$(B–A), $k_{02}$(G–A) and $k_{03}$(R–A). The dynamic range transformed lightness component $k_1$A is then added to each of the color corrected chromaticity components $k_{01}$(B–A), $k_{02}$(G–A) and $k_{03}$(R–A) to obtain color transformed image data signals B', G' and R'. It should be mentioned that the method of color correction is not limited to the above-described simple change in the ratio of amplification or attenuation and other methods such as matrix operations may be employed.

Described above is the way to obtain the image data signals that have been color transformed by the color transformation algorithm according to the fourth case, which may be expressed by the following set of equations (14):

$$B' = K_{01}(B-A) + k_1(A-C_1) + C_2$$

$$G' = K_{02}(G-A) + k_1(A-C_1) + C_2$$

$$R' = K_{03}(R-A) + k_1(A-C_1) + C_2 \quad (14)$$

where $k_1$ is the hue-dependent lightness compression coefficient expressed by the above equation (49) or (50); A is a function which determines the median of arbitrary three image data signals B, G and R and which satisfies A=median{B,G,R}; the coefficients $k_{01}$, $k_{02}$ and $k_{03}$ are positive real numbers specified in accordance with the three image data signals B, G and R; and $C_1$ and $C_2$ are constants specified by the color transforming system or the image to be subjected to color transformation.

Typically, the coefficients $k_{01}$, $k_{02}$ and $k_{03}$ are described as the ratio for color correcting the chromaticity components of the respective elements, and the lightness coefficient $k_1$ as the ratio for transforming the dynamic range of the lightness component. As for $C_1$ and $C_2$, the stain densities of the input and output media, respectively, may be employed.

If no specific color corrections such as the adjustment of chromaticity and chroma or the reproduction of a preferred color are to be performed, the coefficients of color correction $k_{01}$, $k_{02}$ and $k_{03}$ may assume an identical value $k_0$ (chroma coefficient $k_0$>0). In this case, the set of equations (14) may be rewritten as follows:

$$\begin{bmatrix} B' \\ G' \\ R' \end{bmatrix} = k_0 \begin{bmatrix} B-A \\ G-A \\ R-A \end{bmatrix} + k_1 \begin{bmatrix} A-C_1 \\ A-C_1 \\ A-C_1 \end{bmatrix} + \begin{bmatrix} C_2 \\ C_2 \\ C_2 \end{bmatrix} \quad (51)$$

If faithful color reproduction is to be performed using the image data signals expressed on a logarithmic scale by the set of equations (2) or the image data signals expressed on a power scale by the set of equations (3), the chroma (color correction) coefficient $k_0$ and the constant term $\alpha$ of the lightness coefficient $k_1$ may be set to appropriate values in accordance with the specific color transforming system used. The following Table 3 lists some examples of the relationship between the color transforming system and the preferred range of each of the chroma coefficient $k_0$ and the constant term $\alpha$ of the lightness coefficient $k_1$.

TABLE 3

Color Transforming System and Preferred Range of Chroma Coefficient and Constant Term for Lightness Coefficient

| Input/Output color transforming system | Chroma coefficient $k_0$ | Constant term $\alpha$ for lightness coefficient $k_1$ |
| --- | --- | --- |
| Reversal film/reflective print | $1.0 \leq k_0/\alpha \leq 1.3$ | $0.7 \leq \alpha \leq 1.0$ |
| Negative film/reflective print | $0.7 \leq k_0/\alpha \leq 1.3$ | $1.0 \leq \alpha \leq 2.0$ |

TABLE 3-continued

Color Transforming System and Preferred Range of Chroma
Coefficient and Constant Term for Lightness Coefficient

| Input/Output color transforming system | Chroma coefficient $k_0$ | Constant term $\alpha$ for lightness coefficient $k_1$ |
|---|---|---|
| CCD camera/reflective print | $0.7 \leq k_0/\alpha \leq 1.3$ | $1.0 \leq \alpha \leq 2.0$ |
| Monitor/reflective print | $0.7 \leq k_0/\alpha \leq 1.3$ | $1.0 \leq \alpha \leq 2.0$ |

As shown in FIG. 7, in the same way as in the first embodiment, the thus obtained color transformed signals B', G' and R' are sent to a printer or a monitor, where these signals are replicated as a reproduced reflection image (print) or a reproduced image displayed on a monitor on which the colors of the original image such as the subject, the image on an original or the image displayed on a monitor are properly reproduced, and of which the important colors are reproduced in a visually preferred lightness level.

In the color transforming method according to the fourth case of the fifth embodiment of the invention, the image data signals are not limited to any particular types and may be derived from any kinds of input/output image and input/output color space. In addition, setting up or known image data processing for reproducing a preferred color may be performed either before or after executing the color transformation algorithm in accordance with the present case.

Described above are the basic features of the color transforming method according to the fourth case of the fifth embodiment of the invention and the image reproducing system to which this method is applied.

As described above in detail, the present invention offers the following advantages:

1) Even if the input original image is a subject, an image on a transmission original (a transmission original hardcopy image), an image on a reflection original (a reflection original hardcopy image) or an image displayed as on a monitor (an original softcopy image), one can create a reproduced hardcopy image such as a reflective print which is extremely faithful to the input original image or, alternatively, one can provide a monitor display of a reproduced image (a reproduced softcopy image) which is also extremely faithful to the input original image.

2) One can create reflective prints which are extremely faithful to subjects and transmission originals (hardcopy images) and the quality of which is distinctively better than what is obtained by the analog system.

3) The processing system is very simple and permits realtime execution.

4) Even transmission original hardcopy images and original softcopy images which are upset in either color balance or density balance or both can be effectively processed to yield reproduced reflection hardcopy images or reproduced softcopy images which feature good balances.

5) Even if the input original image is a subject, an image on a transmission original, an image on a reflection original or an image displayed as on a monitor, one can create a reproduced hardcopy image such as a reflective print on which the colors of the input original image are properly reproduced and which has the important colors, in particular the color of the skin of the face and the blue sky color, finished in a visually preferred lightness level to give a natural impression in a satisfactory and highly precise manner, with the skin color rendered relatively light and the blue sky color relatively deep or, alternatively, one can provide a monitor display of a reproduced image (soft copy image) on which the colors of the input original image are also properly reproduced and which has the important colors, in particular the color of the skin of the face and the blue sky color, finished in a visually preferred lightness level to give a natural impression in a satisfactory and highly precise manner, with the skin color rendered relatively light and the blue sky color relatively deep.

6) One can create visually preferred reflective prints on which the important colors of original images such as subjects and transmission original hardcopy images are finished in a visually preferred lightness level, with the skin color rendered relatively light and the blue sky color relatively deep.

EXAMPLES

The color transforming method of the invention will now be described more specifically with reference to the following examples.

Example 1

A reversal film [Provia 135 Format of Fuji Photo Film Co., Ltd.] was processed with a printer [Pictrography 3000, 200 dpi (PG3000) of Fuji Photo Film Co., Ltd.] and the input image was output on a color paper also available from Fuji Photo Film Co., Ltd. for specific use in said printer. A Model SG1000 (Dainippon Screen Mfg. Co., Ltd.) was used as a scanner but the filters were replaced by ISO narrow-band filters (TCD) and the aperture was adjusted to 25 $\mu$m. The ISO narrow-band filters had the following peak wavelengths: B at 436 nm; G at 546 nm and R at 644 nm.

In preliminary steps, a colorimetric gray scale formed on the reversal film was measured with the scanner SG1000 and a visual densitometer (product of X-RITE) and for each of B, G and R, the scanner-measured integral density was plotted on the horizontal axis and the visual density on the vertical axis to construct the first lookup table LUT1. Similarly, a calorimetric gray scale formed on the color paper was measured with the scanner SG1000 and the visual densitometer and for each of B, G and R, the visual density was plotted on the horizontal axis and the scanner-measured integral density on the vertical axis to construct the second lookup table LUT2.

Thus, a system was established for implementing the color transforming method according to the second embodiment of the invention; see FIG. 8a, in which $TCD_{int}$ designates the scanner-measured integral density; D the integral END of the reversal film CRT; $D_r$ the integral END of the color paper; and PROCESS refers to the process of dynamic range (color space) compression in accordance with the color transforming method of the invention. The integral END depends entirely upon the spectral sensitivities of the scanner. If the coefficient of colorimetric quality is at unity, neither LUT1 nor LUT2 is necessary. In this sense, the integrated END may be described as a signal obtained by gamma correction of the scanner-measured integral density.

Thus, several frames of color transparency image were replicated to produce a reflection print. Depending on the lightness component to be selected, the following three algorithms were used to perform range compression:

$$OCC: D_{ri}=k_0\{D_i(x,y)-\max D_i(x,y)\}+k_1\{\max D_i(x,y)-\min_{(x,y)}\max D_i(x,y)\}+D_{rW}$$

$$MCC: D_{ri}=k_0\{D_i(x,y)-\text{median}D_i(x,y)\}+k_1\{\text{median}D_i(x,y)-\min_{(x,y)}\text{median}D_i(x,y)\}+D_{rW}$$

$$UCC: D_{ri}=k_0\{D_i(x,y)-\min D_i(x,y)\}+k_1\{\min D_i(x,y)-\min_{(x,y)}\min D_i(x,y)\}+D_{rW} \quad (52)$$

The parameter $k_1$ was optimized to ensure that the appearance of the reflection print as perceived with the eye was the closest to that of the reversal film. The optimization was not on a frame basis and the same value of $k_1$ was used for all frames. The value of parameter $k_0$ was at unity in each algorithm but the value of parameter $k_1$ was varied as follows: 0.90 in OCC; 0.85 in MCC; and 0.75 in UCC. The base densities ($D_{rW}$, $D_{rW}$, $D_{rW}$) of the color paper were (0.1, 0.1, 0.1).

Example 2

With the same hardware configuration as used in Example 1, the image on a reversal film was reproduced on a color paper in an output printer (PG3000). The first and second lookup tables LUT1 and LUT2 employed in the process were preliminarily constructed in the following manner.

For each of the reversal film and color paper, the spectral absorption waveform was measured for each of the colorants used. Subsequently, a spectral absorption waveform that would produce a colorimetric gray (a*=b*=0) under a color evaluating fluorescent lamp S(λ) of TOSHIBA CORP. (which waveform is hereunder referred to as "gray waveform") was generated for a plurality of lightness components.

The generated gray waveforms were integrated by the spectral luminance efficiency curve V(λ) and the spectral absorption waveforms of the scanner filters B(λ), G(λ) and R(λ) to construct data on optical densities $D_V$, $D_B$, $D_G$ and $D_R$. These densities were determined by the set of equations (9) with one of the gray waveforms written as f(λ).

For each of the reversal film and color paper, $D_B$, $D_G$ and $D_R$ were plotted on the horizontal axis of a graph and $D_V$ on the vertical axis to thereby construct a lookup table. The first lookup table constructed for the reversal film was designated as LUT1 and the second lookup table for the color paper as LUT2.

The signals transformed by means of the first and second lookup tables LUT1 and LUT2 were three signals within the scope of the invention the values of which coincided for the colorimetric gray and which were on a logarithmic scale with respect to the intensity of light.

The reversal original was recorded with a scanner and transformed to scanner-measured densities $D_B$, $D_G$ and $D_R$ for each pixel, which were then transformed by means of the first lookup table LUT1. Subsequently, three transformations UCC, MCC and OCC were performed according to the algorithms represented by the set of equations (52). The value of parameter $k_0$ was at unity in each algorithm but the value of parameter $k_1$ was varied as follows: 0.90 in OCC; 0.85 in MCC; and 0.75 in UCC. The base densities $D_{rW}$ ($D_{rW}$, $D_{rW}$, $D_{rW}$) of the color paper were keyed to its visual density 0.1 (0.1, 0.1, 0.1).

The thus obtained values ($D_{rB}$, $D_{rG}$, $D_{rR}$) were retransformed to scanner-measured densities by means of the second lookup table LUT2 and supplied to the printer PG3000 to produce a reflection print.

Example 3

With the same hardware configuration as used in Example 1, the image on a reversal film was reproduced on a color paper in an output printer (PG3000). The first and second lookup tables LUT1 and LUT2 employed in the process were preliminarily constructed in the following manner.

A colorimetric gray scale formed on the reversal film was measured with the scanner SG1000 and a visual densitometer (product of X-RITE) and for each of B, G and R, the scanner-measured analytical density was plotted on the horizontal axis and the visual density on the vertical axis to construct the first lookup table LUT1. Similarly, a calorimetric gray scale formed on the color paper was measured with the scanner SG1000 and the visual densitometer and for each of B, G and R, the visual density was plotted on the horizontal axis and the scanner-measured analytical density on the vertical axis to construct the second lookup table LUT2.

Thus, a system was established for implementing the color transforming method according to the second embodiment of the invention; see FIG. 8b, in which $TCD_{ana}$ designates the scanner-measured analytical density; D the END of the reversal film; $D_r$ the END of the color paper; and PROCESS refers to the process of dynamic range (color space) compression in accordance with the color transforming method of the invention. The END is a concept introduced by Evans and refers to a technique by which the value of the visual density of a gray equivalent to a given set of colorants is assigned to the colorants of interest. Since END is a value inherent in a specific colorant, it is not dependent on the spectral sensitivities of the scanner.

Thus, several frames of color transparency image were replicated to produce a reflection print.

For the selection of the lightness components in the algorithms for range compression, the values of parameters $k_0$ and $k_1$ and the base density of the color paper, see the relevant description in Example 1.

The reflection prints obtained in Examples 1, 2 and 3 were examined visually and evaluated. As general characters, all prints were extremely faithful to the images on the reversal film originals (hereunder referred to as "reversal originals") and the colors characteristic of the reversal originals were solidly reproduced. In addition, all prints were higher in chroma than their originals. Since the reflection prints were extremely faithful to the reversal originals, the characters of the latter were reflected in the former most faithfully (i.e., they even reflected the problems with the reversal originals in that they were superb with nature photos but showed a tendency to produce a skin color of too high densities in portraits). Further, the prints were partially "color-blind" in brilliant colors as in flowers. Plausible causes of this phenomenon include the non-linear correlationship between density and visual perception (i.e., Weber-Fechner's law does not hold strictly) and the inability of hues to be defined by the ratio of antialgorithms. Whichever the true reason, the high-chromaticity (color blindness) problem can be alleviated by changing the value of parameter $k_0$. The high chroma is a problem to the purpose of achieving faithful reproduction but if the final product is intended for ordinary users, this is more preferred than disliked and may well be described as a desirable result.

The following are the results of evaluation according to the selection of different lightness components. In OCC, the contrast was so high (compared to the original) that the brightness of the face was compatible with the solidness of black. In addition, the clearness of white was satisfactory (better than the original). However, the degree of color blindness was highly noticeable. In MCC, the print featured very high fidelity to the original. In UCC, the brightness of the skin color and the solidness of black were tradeoffs. The contrast was low. On the other hand, best results were attained in the problem of color blindness.

Each of the three transformation formulae for OCC, MCC and UCC yielded a print the impression of which was very close to that of the image on the input original (reversal film). It had the high level of fidelity so far unattainable by the prior art. Further, the method of the invention was so convenient that it was quite outstanding in the computing speed and operating cost.

Thus, the effectiveness of the color transforming method according to the second embodiment of the invention is obvious.

In terms of fidelity to the original, MCC is the best but considering the color quality of the print per se, OCC would be better. This could derive from the difference in viewing conditions between the image on the reversal film and the image on the reflection print.

In the system shown in FIG. 8a, the integral END densities used in Examples 1 and 2 depend entirely upon the spectral sensitivities of the scanner; however, in the system shown in FIG. 8b, the END densities used in Example 3 are inherent in the colorants and, hence, do not depend on the spectral sensitivities of the scanner. The END is an analytical density, so if the difference in colorants between the images on a transmission and a reflection original is not considered, the hues of certain colors, for example, magentas can potentially have offsets. In addition, the END does not take into account the fact that compared to the reversal film which is viewed under transmitted light, the color paper which is viewed under reflected light suffers from a comparatively great increase in unwanted absorption. However, if the difference in colorants between the images on the transmission and reflection originals is not a problem or is fully taken into account, an END using system such as the one established in Example 3 can reproduce an image on a reflection print which is highly faithful to the image on the transmission original.

Example 4

The image data on an appropriately exposed color reversal film (Fuji Chrome Provia of Fuji Photo Film Co., Ltd.) was recorded with a drum scanner (SG1000 of Dainippon Screen Mfg. Co., Ltd.) as in Example 3 and transformed to optical densities per pixel, which in turn were transformed to equivalent neutral densities (END). The resulting image data was subjected to the following transformation:

$$\begin{bmatrix} B' \\ G' \\ R' \end{bmatrix} = k_0 \begin{bmatrix} B - \text{Median}(B, G, R) \\ G - \text{Median}(B, G, R) \\ R - \text{Median}(B, G, R) \end{bmatrix} + k_1 \begin{bmatrix} \text{Median}(B, G, R) - 0.16 \\ \text{Median}(B, G, R) - 0.16 \\ \text{Median}(B, G, R) - 0.16 \end{bmatrix} + \begin{bmatrix} 0.1 \\ 0.1 \\ 0.1 \end{bmatrix}$$

where $k_0=1.0$ and $k_1=0.9$; the constants 0.16 and 0.1 refer to the stain densities of the color reversal film and the color photographic paper, respectively.

As in Example 3, the transformed image data were processed with an END managed color printer (Pictrography (PG) 3000 of Fuji Photo Film Co., Ltd.), thereby outputting a reflection print that was extremely faithful to the color reversal film.

Example 5

A subject was imaged with a digital steel camera (DS300 of Fuji Photo Film Co., Ltd.) and the obtained image data were subjected to the following transformation:

$$\begin{bmatrix} B' \\ G' \\ R' \end{bmatrix} = k_0 \begin{bmatrix} B - \text{Median}(B, G, R) \\ G - \text{Median}(B, G, R) \\ R - \text{Median}(B, G, R) \end{bmatrix} + k_1 \begin{bmatrix} \text{Median}(B, G, R) - 255 \\ \text{Median}(B, G, R) - 255 \\ \text{Median}(B, G, R) - 255 \end{bmatrix} + \begin{bmatrix} 255 \\ 255 \\ 255 \end{bmatrix}$$

where $k_0=1.1$ and $k_1=0.9$. Any signal value that was less than 0 or greater than 255 was clipped to 0 or 255, respectively.

The transformed image data were displayed on a PC monitor (Multiscan17seII of SONY CORP.) The resulting monitor image was faithful to the subject.

Example 6

Image data displayed on a PC monitor (Multiscan17seII) were subjected to the following transformation:

$$\begin{bmatrix} B' \\ G' \\ R' \end{bmatrix} = k_0 \begin{bmatrix} B - \text{Median}(B, G, R) \\ G - \text{Median}(B, G, R) \\ R - \text{Median}(B, G, R) \end{bmatrix} + k_1 \begin{bmatrix} \text{Median}(B, G, R) - 255 \\ \text{Median}(B, G, R) - 255 \\ \text{Median}(B, G, R) - 255 \end{bmatrix} + \begin{bmatrix} 255 \\ 255 \\ 255 \end{bmatrix}$$

where $k_1=1.7$ and $k_2=1.5$. Any signal value that was less than 0 or greater than 255 was clipped to 0 or 255, respectively.

The transformed image data were output with a color printer (Pictrography 3000) to yield a reflection print faithful to the monitor image.

Example 7

Image data displayed on a PC monitor (Multiscan17seII) was transformed to tristimulus values X, Y and Z in accordance with CCIR-rec709 and the obtained tristimulus values X, Y and Z were subjected to the following transformation:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R^{2.2} \\ G^{2.2} \\ B^{2.2} \end{bmatrix}$$

$$N_X = (X/X_0)^{1/3}$$

$$N_Y = (Y/Y_0)^{1/3}$$

$$N_Z = (Z/Z_0)^{1/3}$$

where $X_0$, $Y_0$ and $Z_0$ are tristimulus values for the case when B=G=R=255. The obtained image data were subjected to the following transformation:

$$\begin{bmatrix} N'_X \\ N'_Y \\ N'_Z \end{bmatrix} = k_0 \begin{bmatrix} N_X - \text{Median}(N_X, N_Y, N_Z) \\ N_Y - \text{Median}(N_X, N_Y, N_Z) \\ N_Z - \text{Median}(N_X, N_Y, N_Z) \end{bmatrix} +$$

$$k_1 \begin{bmatrix} \text{Median}(N_X, N_Y, N_Z) - 1.0 \\ \text{Median}(N_X, N_Y, N_Z) - 1.0 \\ \text{Median}(N_X, N_Y, N_Z) - 1.0 \end{bmatrix} + \begin{bmatrix} 1.0 \\ 1.0 \\ 1.0 \end{bmatrix}$$

where $k_1=1.7$ and $k_2=1.5$. Any signal value that was greater than 1.0 or less than 0.0 was clipped to 1.0 or 0.0, respectively.

The transformed image data were further transformed to calorimetric values which were output to a color printer (Pictrography 3000) managed with calorimetric values in which the white background of the photographic paper was a reference white. As a result, there was yielded a reflection print faithful to the monitor image.

Example 8

A color negative film (SG400 of Fuji Photo Film Co., Ltd.) was preliminarily exposed in tones under white light. After development, the image density was measured with a drum scanner (SG1000 of Dainippon Screen Mfg. Co., Ltd.) and the scanner-measured integral density was plotted on the horizontal axis and the exposure density on the vertical axis to construct the first lookup table.

In a separate step, a color paper for specific use on Pictrography 3000 (printer of Fuji Photo Film Co., Ltd.) was processed to generate colorimetric gray waveforms as in Example 2, which were integrated with the spectral sensitivities or spectral luminous efficiency curves of a color negative film (SG400) to calculate optical density data. The spectral sensitivity integrated density was plotted on the vertical axis and the visual density on the horizontal axis to construct the second lookup table.

A subject was photographed on a color negative film (SG400), after development, the image data were recorded with a scanner (SG1000) and transformed to integral densities per pixel, which in turn were transformed to exposure densities with the intermediary of the first lookup table, followed by the following arithmetic operation:

$$\begin{bmatrix} B' \\ G' \\ R' \end{bmatrix} = 1.3 \begin{bmatrix} B - \text{Median}(B, G, R) \\ G - \text{Median}(B, G, R) \\ R - \text{Median}(B, G, R) \end{bmatrix} +$$

$$1.5 \begin{bmatrix} \text{Median}(B, G, R) - N \\ \text{Median}(B, G, R) - N \\ \text{Median}(B, G, R) - N \end{bmatrix} + \begin{bmatrix} 0.75 \\ 0.75 \\ 0.75 \end{bmatrix}$$

where N is a gray's exposure density providing a reflectance of 18%.

Subsequently, the densities (B',G',R') were transformed to spectral sensitivity integrated densities with the intermediary of the second lookup table; the integral densities were output by means of Pictrography 3000 to yield a print extremely faithful to the subject.

In this example, the chroma coefficient $k_0$ was relatively smaller than the lightness coefficient $k_1$ because the color negative film used (SG400) featured great chemical chroma enhancement (i.e., interlayer effect). Therefore, if a color negative film having only a weak interlayer effect is to be used or in the case where the transformation from the scanner-measured integral density to the exposure density is accompanied by a procedure of eliminating the interlayer effect, the chroma coefficient $k_0$ preferably assumes a little greater value.

Example 9

In Examples 1–4, the image data on the reversal originals were transformed to equivalent neutral densities or integral equivalent neutral densities (B,G,R) per pixel, which were then subjected to the following transformation:

$B'=1.0-10^{-(B-0.16)/3}$ $G'=1.0-10^{-(G-0.16)/3}$ $R'=1.0-10^{-(R-0.16)/3}$

Thereafter, the following color transformation was effected:

$$\begin{bmatrix} B' \\ G' \\ R' \end{bmatrix} = \begin{bmatrix} B - \text{Median}(B, G, R) \\ G - \text{Median}(B, G, R) \\ R - \text{Median}(B, G, R) \end{bmatrix} + 0.9 \begin{bmatrix} \text{Median}(B, G, R) \\ \text{Median}(B, G, R) \\ \text{Median}(B, G, R) \end{bmatrix}$$

Subsequently, the following transformation was performed:

$B'=-3 \log_{10}(1-B)+0.1$ $G'=-3 \log_{10}(1-G)+0.1$ $R'=-3 \log_{10}(1-G)+0.1$ The transformed signals were further transformed to analytical or integral densities with the intermediary of the second lookup table and output by means of Pictrography 3000 to yield prints extremely faithful to the reversal originals. As can be seen from this example, the effectiveness of the invention is fully retained even if the equivalent neutral densities or integral equivalent neutral densities are represented on a cube root scale rather than on a logarithmic scale.

Example 10

A subject was photographed on SG400 (color negative film of Fuji Photo Film Co., Ltd.) and output to a printer as in Example 8, except that the scanner and the printer were changed from SG1000 and Pictrography 3000 to Digital Lab System Frontier of Fuji Photo Film Co., Ltd. (the combination of high-speed scanner/image processing workstation SP-1000 and laser printer/paper processor LP-1000P). As a result, there was yielded a print which was extremely faithful to the subject.

As is clear from Examples 4–10, the image reproduced on the reflection print, as well as the image reproducing the display on the monitor which were obtained by applying the color transforming method according to the first embodiment of the invention were a faithful reproduction of the input original image irrespective of whether it was the image on a transmission original such as a reversal film, or a subject or an image displayed on a monitor.

Therefore, the effectiveness of the color transforming method according to the first embodiment of the invention is obvious.

It should also be noted that the effectiveness of the color transforming method according to the third embodiment of the invention is obvious from Examples 1–10 and it is also obvious that the same effectiveness can be achieved by the color transforming method according to the fourth embodiment of the invention.

Example 11

An exposed and developed color negative film (Super G ACE400 of Fuji Photo Film Co., Ltd.) was read with a scanner (Frontier of Fuji Photo Film Co., Ltd.) and the input image data were transformed to color signals (B,G,R) for each pixel. Then, the following four kinds of mathematical operations for hue-dependent gamma increasing were performed:

$$\begin{pmatrix} B' \\ G' \\ R' \end{pmatrix} = [1.0 - 0.2(R-B)] \cdot \begin{pmatrix} B-255 \\ G-255 \\ R-255 \end{pmatrix} + \begin{pmatrix} 255 \\ 255 \\ 255 \end{pmatrix}$$

$$\begin{pmatrix} B' \\ G' \\ R' \end{pmatrix} = [1.0 - 0.2(\text{median}-B)] \cdot \begin{pmatrix} B-255 \\ G-255 \\ R-255 \end{pmatrix} + \begin{pmatrix} 255 \\ 255 \\ 255 \end{pmatrix}$$

$$\begin{pmatrix} B' \\ G' \\ R' \end{pmatrix} = \left[1.0 - 0.2\left(\frac{B+G+R}{3} - B\right)\right] \cdot \begin{pmatrix} B-255 \\ G-255 \\ R-255 \end{pmatrix} + \begin{pmatrix} 255 \\ 255 \\ 255 \end{pmatrix}$$

$$\begin{pmatrix} B' \\ G' \\ R' \end{pmatrix} = \begin{pmatrix} B-\text{median} \\ G-\text{median} \\ R-\text{medina} \end{pmatrix} + [1.0 - 0.2(R-B)] \cdot \begin{bmatrix} \text{median}-255 \\ \text{median}-255 \\ \text{median}-255 \end{bmatrix} + \begin{pmatrix} 255 \\ 255 \\ 255 \end{pmatrix}$$

were "median" represents the median value of said color signals (B,G,R) for each pixel.

The thus transformed color signals (B',G',R') were subjected to color correction through the image processing circuit packaged in a digital color printer (Frontier of Fuji Photo Film Co., Ltd.), from which the color corrected signals were output to yield in all cases visually preferred reflection prints.

Example 12

An exposed and developed color reversal film (Provia of Fuji Photo Film Co., Ltd.) was read with a drum scanner (SG1000 of Dainippon Screen Mfg. Co., Ltd.) and the color signals for each pixel were transformed to equivalent neutral densities (B,G,R) for each pixel. Then, the following two kinds of mathematical operations for hue-dependent gamma increasing were performed:

$$\begin{pmatrix} B' \\ G' \\ R' \end{pmatrix} = [0.8 + 0.1(R-B)] \begin{pmatrix} 1.2 & -0.1 & -0.1 \\ -0.1 & 1.2 & -0.1 \\ -0.1 & -0.1 & 1.2 \end{pmatrix} \begin{pmatrix} B-0.15 \\ G-0.15 \\ R-0.15 \end{pmatrix} + \begin{pmatrix} 0.1 \\ 0.1 \\ 0.1 \end{pmatrix}$$

$$\begin{pmatrix} B' \\ G' \\ R' \end{pmatrix} = \begin{pmatrix} B-\max \\ G-\max \\ R-\max \end{pmatrix} + [0.9 + 0.1(R-B)] \cdot \begin{pmatrix} \max-0.15 \\ \max-0.15 \\ \max-0.15 \end{pmatrix} + \begin{pmatrix} 0.1 \\ 0.1 \\ 0.1 \end{pmatrix}$$

where "max" represents the maximum value of the color signals (B,G,R) for each pixel.

The thus obtained equivalent neutral densities (B',G',R') were transformed to QL values of a color printer (Pictrography 3000 of Fuji Photo Film Co., Ltd.), with the intermediary of a tridimensional lookup table which represents the relationship between the equivalent neutral densities for a color image formed on a photographic paper exclusively used in the color printer and the QL values (0 to 255) of the color printer corresponding to the color image formed. The obtained QL values were output from the color printer to yield in both cases visually preferred reflection prints.

Example 13

A subject was imaged with a digital steel camera (DS300 of Fuji Photo Film Co., Ltd.) and the obtained image data were transformed to color signals (B,G,R) for each pixel, which were then subjected to the following mathematical operation:

$$\begin{pmatrix} B' \\ G' \\ R' \end{pmatrix} = 1.2 \begin{pmatrix} B-\min \\ G-\min \\ R-\min \end{pmatrix} + [0.9 + 0.1(R-B)] \cdot \begin{pmatrix} \min-255 \\ \min-255 \\ \min-255 \end{pmatrix} + \begin{pmatrix} 255 \\ 255 \\ 255 \end{pmatrix}$$

where "min" represents the minimum value of the color signals (B,G,R) for each pixel.

The thus obtained color signals (B', G', R') were displayed on a PC monitor (Multiscan17seII of SONY CORP.). A visually preferred monitor image was obtained. cl Example 14

A subject was imaged with a digital steel camera (DS300 of Fuji Photo Film Co., Ltd.) and the obtained image data were transformed to color signals (B, G, R) for each pixel, which were then subjected to the following mathematical operation:

$$\begin{pmatrix} B' \\ G' \\ R' \end{pmatrix} = 1.3 \begin{pmatrix} B-\min \\ G-\min \\ R-\min \end{pmatrix} + [1.0 + 0.2(R-B)] \cdot \begin{pmatrix} \min-255 \\ \min-255 \\ \min-255 \end{pmatrix} + \begin{pmatrix} 255 \\ 255 \\ 255 \end{pmatrix}$$

where "min" represents the minimum value of the color signals (B,G,R) for each pixel.

The thus obtained color signals (B', G',R') were displayed on a color printer (Pictrography 3000 of Fuji Photo Film Co., Ltd.). A visually preferred print image was obtained.

As is clear from Examples 11 to 14, reproduced images such as the reflection print and the monitor-displayed image obtained by the color transforming method according to the fifth embodiment of the invention were those on which the colors of an input original image were properly or faithfully reproduced, with the important colors, that is, the color of the skin of the face and the blue sky color being reproduced in a visually preferred lightness level, and which give a natural impression in a satisfactory manner, irrespective of the nature of the input original image. Therefore, the effect of the color transforming method according to the fifth embodiment of the invention is apparent.

While the basic features of the color transforming methods according to the four embodiments of the invention have been described above, it should be noted that these are not the sole cases of the invention and various improvements and design modifications may be made without departing from the scope and spirit of the invention.

What is claimed is:

1. A color transformation method, in which input image data from an image input device, represented by three signals that are mutually independent and provide a color of gray when values of the three signals coincide, are subjected to a color transformation to produce output image data for production of an image by an image output device, the output image data being represented by three color transformed signals, which method comprises the steps of:

determining, for each pixel:
a lightness component specified between a maximum value and a minimum value for said three signals, and
three chromaticity components obtained by subtracting said lightness component from said three signals respectively;
modifying the three chromaticity components in accordance with said three signals, said modifying being one of amplifying and attenuating; and
adding the chromaticity components to said lightness component modified in accordance with said three signals to produce said output image data.

2. The color transforming method according to claim 1, wherein, when said three signals are designated by (B,G,R) and said three color transformed signals by (B',G',R') for each pixel, the color transformation from said three signals to said three color transformed signals is represented by:

$$B'=K_{01}\{B-f(B,G,R)\}+k_1\{f(B,G,R)-C_1\}+C_2$$

$$G'=K_{02}(G-f(B,G,R)\}+k_1\{f(B,C,R)-C_1\}+C_2$$

$$R'=K_{03}\{R-f(B,G,R)\}+k_1(f(B,G,R)-C_1\}+C_2$$

where;
$f(B,G,R)$ is a function that satisfies $\min(B,G,R) \leq f(B,G,R) \leq \max(B,G,R)$ for any set of said three signals (B,G,R);
the coefficients $K_{01}$, $K_{02}$, $K_{03}$ and $k_1$ are positive real numbers specified in accordance with said three signals B, G and R; and
$C_1$ and $C_2$ are constants specified by one of the color transforming system and the image to be subjected to color transformation.

3. The color transforming method according to claim 1, wherein, when all of said values of said three signals coincide and are expressed by a signal value N, the signal value N is one of:
a linear function of a logarithm of a luminance L of the corresponding gray, and expressed by $N=C_1 \log L+c_2$; and
a linear function of a power of said luminance L of said corresponding gray, and expressed by $N=c_1L\gamma+c_2$;
where the exponent $\gamma$ is a real number satisfying $0<\gamma<1$, and $c_1$ and $c_2$ are constant.

4. The color transforming method according to claim 3, wherein:
said three signals represent any one of; equivalent neutral density, integral equivalent neutral density, exposure density, logarithmic exposure, colorimetric density, TV monitor signals, and signals by the following set of equations:

$$N_x=(X/X_0)^{1/3}=(L*+16)/116+a*/500$$

$$N_y=(Y/Y_0)^{1/3}=(L*+16)/116$$

$$N_z=(Z/Z_0)^{1/3}=(L*+16)/116-b*/200$$

where:
X, Y and Z are tristimulus values;
$X_0$, $Y_0$ and $Z_0$ are the tristimulus values of a reference white;
$L*$ is a psychometric lightness for the $L*a*b*$ color space; and
$a*$ and $b*$ are perceived psychometric chromaticities.

5. The color transforming method according to claim 1, wherein said lightness component is one of a maximum value, a minimum value and a median value of said three signals.

6. The color transforming method according to claim 1, wherein said input image data are of an original scene or a original hardcopy image, and said output image data are used to produce hardcopy images.

7. The color transforming method according to claim 6, wherein, when said three signals are designated by (B2,G2,R2) and said three color transformed signals by (B3,G3,R3) for each pixel, the transformation from said three signals to said three color transformed signals is executed using by the following set of equations:

$$B3=k_0(B2-A)+k_1(A-\min(xy)A)+BW$$

$$G3=k_0(G2-A)+k_1(A-\min(xy)A)+GW$$

$$R3=k_0(R2-A)+k_1(A-\min(xy)A)+RW$$

where:
A is a function representing said lightness component specified for said three signals (B2,G2,R2) and satisfying $\min\{B2,G2,R2\} \leq A \leq \max\{B2,G2,R2\}$;
$k_0$ and $k_1$ are constants;
(BW,GW,RW) represents the base density of the reflection medium; and
$\min(xy)A$ represents a minimum value of A for all pixels in the entire image forming area.

8. The color transforming method according to claim 7, wherein:
said lightness component A is represented by any one of the equations:

$$A=\min\{B2,G2,R2\},$$

$$A=\max\{B2,G2,R2\},$$

and $$A=\text{median}\{B2,G2,R2\},$$

where "median" is a function representing the second largest value for a given set of (B2,G2,R2).

9. The color transforming method according to claim 7, wherein:
said original hardcopy image is a color positive image formed on a transparent medium comprising at least three colorants, and
said constants $k_0$ and $k_1$ satisfy $0.7<k_1<k_0 \leq 1$.

10. The color transforming method according to claim 7, wherein said minimum value $\min(xy)A$ equals a constant between 0.0 and 0.3.

11. The color transforming method according to claim 6, wherein:
said original hardcopy image is a color positive image formed on a transparent medium comprising at least three colorants;
said three signals represent integral equivalent neutral densities of three colors obtained by a process comprising the steps of:
recording said color positive image with a scanner having three linearly independent spectral sensitivities to produce original image signals for each pixel, transforming them to produce integral densities as measured by said scanner, and transforming said integral densities; and said three color transformed signals represent the color transformed integral equivalent neutral densities of the three colors and are transformed to at least three second color transformed signals for replication on the reflection medium.

12. The color transforming method according to claim 11, wherein;

the three linearly independent spectral sensitivities of said scanner are designated by B, G and R, said integral densities are represented by densities (B1, G1, R1) per pixel, said integral equivalent neutral densities of three colors are represented by densities (B2, G2, R2) per pixel, said color transformed integral equivalent neutral densities of three colors are represented by densities (B3, G3, R3) per pixel, and said second color transformed signals of three colors by densities (B4, G4, R4) per pixel, said integral densities (B1, G1, R1) per pixel are transformed to said densities (B2, G2, R2) in accordance with the following set of equations with the intermediary of a preliminarily constructed first lookup table LUT1:

$B2=LUT1_B(B1)$ $G2=LUT1_G(G1)$ $R2=LUT1_R(R1);$ said densities (B3, G3, R3) are transformed to said densities (B4, G4, R4) in accordance with the following set of equations with the intermediary of a preliminarily constructed second lookup table LUT2 and both densities are output to a printer:

$B4=LUT2_B(B3)$ $G4=LUT2_G(G3)$ $R4=LUT2_R(R3);$ when the densities (B4, G4, R4) are greater than the maximum density of said reflection medium, said densities (B4, G4, R4) are clipped to said maximum density; and when the densities (B4, G4, R4) are smaller than the minimum density of said reflection medium, said densities (B4, G4, R4) are clipped to said minimum value.

13. The color transforming method according to claim 12, wherein:

said first lookup table LUT1 is constructed by a process comprising the steps of:
preliminarily forming a gray scale on the transparent medium,
measuring the transmission density at more than one point by means of said scanner and a densitometer having a fourth spectral sensitivity, and
plotting for each of B, G and R the transmission density from said scanner on the horizontal axis and the transmission density from said densitometer on the vertical axis; and said second lookup table LUT2 is constructed by a process comprising the steps of:
preliminarily forming a gray scale on the reflection medium,
measuring the reflection density at more than one point by means of said scanner and said densitometer, and
plotting the reflection density from said scanner on the vertical axis and the refelection density from said densitometer on the horizontal axis.

14. The color transforming method according to claim 12, wherein:

said first second lookup tables LUT1 and LUT2 are constructed by a process comprising the steps of:
preliminarily measuring the spectral absorption waveforms of said three colorants in said transparent and reflection media,
generating for more than one lightness value a spectral absorption waveform which produces a gray under a light source $S(\lambda)$,
integrating the generated gray spectral absorption waveforms $f(\lambda)$, by a spectral luminous efficiency curve $V(\lambda)$ and the spectral absorption waveforms of the filters in said scanner $B(\lambda)$, $G(\lambda)$ and $R(\lambda)$,
constructing data on optical densities $D_V$, $D_B$, $D_G$ and $D_R$ in accordance with the following set of equations:

$$D_V = \log_{10} \int_{380}^{780} V(\lambda)S(\lambda)d\lambda - \log_{10} \int_{380}^{780} f(\lambda)V(\lambda)S(\lambda)d\lambda \quad (10)$$

$$D_B = \log_{10} \int_{380}^{780} B(\lambda)S(\lambda)d\lambda - \log_{10} \int_{380}^{780} f(\lambda)B(\lambda)S(\lambda)d\lambda$$

$$D_G = \log_{10} \int_{380}^{780} G(\lambda)S(\lambda)d\lambda - \log_{10} \int_{380}^{380} f(\lambda)G(\lambda)S(\lambda)d\lambda$$

$$D_R = \log_{10} \int_{380}^{780} R(\lambda)S(\lambda)d\lambda - \log_{10} \int_{380}^{780} f(\lambda)R(\lambda)S(\lambda)d\lambda$$

and
plotting the optical density $D_V$ on the vertical axis and optical densities $D_B$, $D_G$ on $D_R$ on the horizontal axis for each of said transparent and reflection media.

15. The color transforming method as set forth in claim 1, wherein said image input device is one of a scanner, a digital camera, a video camera, a monitor, and a video projector, and said image output device is one of a printer, a monitor, and a video projector.

16. The color transforming method as set forth in claim 1, wherein said image input device is one of a scanner and a digital camera, and said image output device is one of a printer and a monitor.

17. The color transforming method as set forth in claim 1, wherein said image input device is a scanner and said image output device is a printer.

* * * * *